United States Patent
Yamaguchi et al.

(10) Patent No.: US 10,639,884 B2
(45) Date of Patent: May 5, 2020

(54) INK-JET PRINTING APPARATUS, INK-JET PRINTING METHOD, AND STORAGE MEDIUM

(71) Applicant: CANON KABUSHIKI KAISHA, Tokyo (JP)

(72) Inventors: Hiromitsu Yamaguchi, Yokohama (JP); Fumitaka Goto, Tokyo (JP); Yuto Kajiwara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/027,836

(22) Filed: Jul. 5, 2018

(65) Prior Publication Data

US 2019/0016123 A1 Jan. 17, 2019

(30) Foreign Application Priority Data

Jul. 12, 2017 (JP) ................................. 2017-136434

(51) Int. Cl.
| | |
|---|---|
| B41J 2/045 | (2006.01) |
| B41J 2/21 | (2006.01) |
| G06K 15/10 | (2006.01) |
| B41J 2/205 | (2006.01) |

(52) U.S. Cl.
CPC ....... *B41J 2/04508* (2013.01); *B41J 2/04586* (2013.01); *B41J 2/2054* (2013.01); *B41J 2/2132* (2013.01); *G06K 15/105* (2013.01)

(58) Field of Classification Search
CPC .. B41J 2/04508; B41J 2/04586; B41J 2/2132; B41J 2/2054; G06K 15/105
USPC .......................................... 347/9, 12, 14, 15
See application file for complete search history.

(56) References Cited

U.S. PATENT DOCUMENTS

| | | | |
|---|---|---|---|
| 8,714,678 B2 | 5/2014 | Konno et al. | |
| 2012/0050365 A1 | 3/2012 | Konno et al. | |

FOREIGN PATENT DOCUMENTS

JP 5539118 7/2014

*Primary Examiner* — An H Do
(74) *Attorney, Agent, or Firm* — Venable LLP

(57) ABSTRACT

In a print head, a plurality of ejection ports for ejecting metallic ink, including a solvent and particles for imparting a metallic gloss, are arranged in a predetermined direction. A plurality of printing scans are performed to the same area of the print medium to print an image on the print medium. In the printing scan, the metallic ink being ejected from the print head to a print medium while moving the print head in a scanning direction intersecting the predetermined direction. At least one of the plurality of printing scans is set as a first scan having a higher print ratio than the other printing scans.

21 Claims, 22 Drawing Sheets

INK-JET PRINTING APPARATUS, INK-JET PRINTING METHOD, AND STORAGE MEDIUM

BACKGROUND OF THE INVENTION

Field of the Invention

The present invention relates to an ink-jet printing apparatus that ejects a printing liquid, such as ink, from a print head to a print medium while moving the print head to print an image. In particular, the present invention relates to an ink-jet printing apparatus, an ink-jet printing method, and a storage medium which are used for ink-jet printing using metallic ink with a function of imparting a metallic gloss.

Description of the Related Art

In recent years, metallic ink including metallic particles has been provided as ink that can be used to print on a print medium by, for example, an ink-jet printing apparatus. The use of the metallic ink makes it possible to impart a metallic gloss to a printed matter.

In the related art, a so-called one-pass printing method has been known which ejects ink to the same area in one printing scan in order to improve the gloss of an ink-jet printed matter. In general, in the one-pass printing method, unevenness is less likely to occur on the surface of a printed matter than that in a so-called multi-pass printing method which can eject ink to the same area in a plurality of printing scans. As a result, a high gloss of the printed matter can be obtained. The gloss of the printed matter and a metallic gloss are different image quality evaluation items. The metallic gloss is also improved by the one-pass printing method.

SUMMARY OF THE INVENTION

However, in the one-pass printing method, since printing is performed by one printing scan, a difference in the amount of ink ejected from each nozzle of the ink-jet print head used and a difference (deviation) in landing position appear as the density unevenness of a print image.

In contrast, in the multi-pass printing method, since a printing scan is performed for the same area a plurality of times, the influence of a difference in the amount of ink ejected from each nozzle and the deviation of the landing position of ink in an ejection direction is averaged and the density unevenness of a print image is reduced. Although the surface irregularity of the print image increases, a metallic gloss is reduced.

Japanese Patent No. 5539118 discloses a method which performs a printing scan for ejecting clear ink (image quality improvement liquid) after a printing scan for ejecting color ink to reduce gloss unevenness in an ink-jet printing apparatus using the color ink and the clear ink. As described above, the gloss of a printed matter and the metallic gloss are different image quality evaluation items. The ejection of the clear ink makes it possible to improve the gloss of a general printed matter. However, the ejection of the clear ink is insufficient to improve the metallic gloss.

As such, in the method according to the related art, it is difficult to create a printed matter with a high metallic gloss and small density unevenness.

The invention provides an ink-jet printing apparatus, an ink-jet printing method, and a storage medium that can improve the metallic gloss of a printed matter and can reduce the density unevenness of the printed matter in ink-jet printing using metallic ink with a function of imparting a metallic gloss.

In the first aspect of the present invention, there is provided an ink-jet printing apparatus comprising:

a print head in which a plurality of ejection ports for ejecting metallic ink, including a solvent and particles for imparting a metallic gloss, are arranged in a predetermined direction; and a control unit configured to perform a plurality of printing scans to the same area of the print medium to print an image on the print medium, in the printing scan, the metallic ink being ejected from the print head to a print medium while moving the print head in a scanning direction intersecting the predetermined direction, wherein the control unit sets at least one of the plurality of printing scans as a first scan having a higher print ratio than the other printing scans.

In the second aspect of the present invention, there is provided an ink-jet printing method that uses a print head in which a plurality of ejection ports for ejecting metallic ink, including a solvent and particles for imparting a metallic gloss, are arranged in a predetermined direction, a plurality of printing scans being performed to the same area of the print medium to print an image on the print medium, in the printing scan, the metallic ink being ejected from the print head to a print medium while moving the print head in a scanning direction intersecting the predetermined direction, the method comprising:

a controlling step of performing the plurality of printing scans and setting at least one of the plurality of printing scans as a first scan having a higher print ratio than the other printing scans.

In the third aspect of the present invention, there is provided a non-transitory computer-readable storage medium which stores a program causing a computer to perform the ink-jet printing method according to the second aspect of the present invention.

According to the invention, it is possible to create a printed matter with a high metallic gloss and small density unevenness in ink-jet printing using metallic ink including particles with a function of imparting a metallic gloss.

Further features of the present invention will become apparent from the following description of exemplary embodiments with reference to the attached drawings.

DESCRIPTION OF THE EMBODIMENTS

Hereinafter, embodiments of the invention will be described in detail with reference to the drawings.

<Printing Apparatus>

Figure 1:
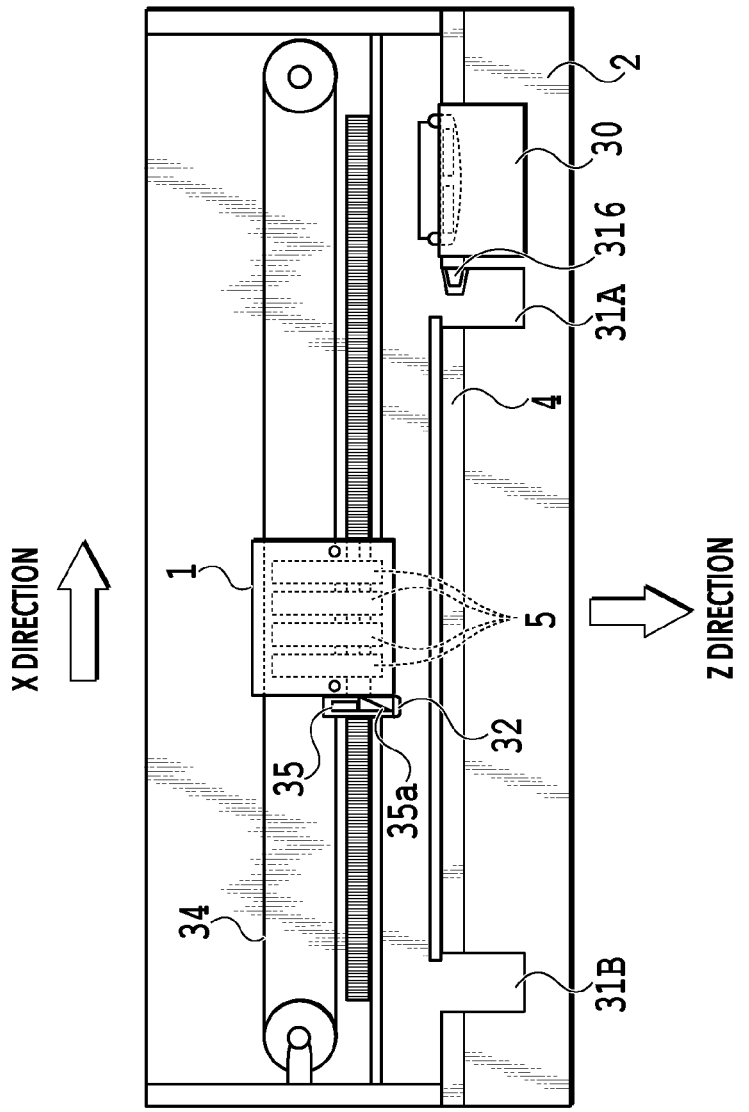
FIG. 1 is a diagram illustrating an ink-jet printing apparatus according to an embodiment.

FIG. 1 is a side cross-sectional view illustrating the configuration of a printing unit of an ink-jet printing apparatus 2 (hereinafter, simply referred to as a printing apparatus) that can be used in the invention. A carriage 1 including four print heads 5 and an optical sensor 32 can be reciprocated in a X direction of FIG. 1 by the driving force of a carriage motor which is transmitted through a belt 34. The print heads 5 eject ink in a Z direction on the basis of print data while the carriage 1 is relatively moved in the X direction with respect to a print medium. In this way, an image corresponding to one printing scan is printed on the print medium disposed on a platen 4. In a case where one printing scan ends, the print medium is transported in a Y direction (transport direction) intersecting the X direction of FIG. 1 by a distance corresponding to a print width in one printing scan. A plurality of printing scans and transport operations are alternately repeated to sequentially form an image on the print medium.

The optical sensor 32 performs a detection operation while being moved together with the carriage 1 to determine whether a print medium is present on the platen 4. A recovery unit 30 for performing a maintenance process for the print heads 5 is provided at a position that is located in a scanning area of the carriage 1 and is outside the platen 4.

<Print Head>

Figure 2:
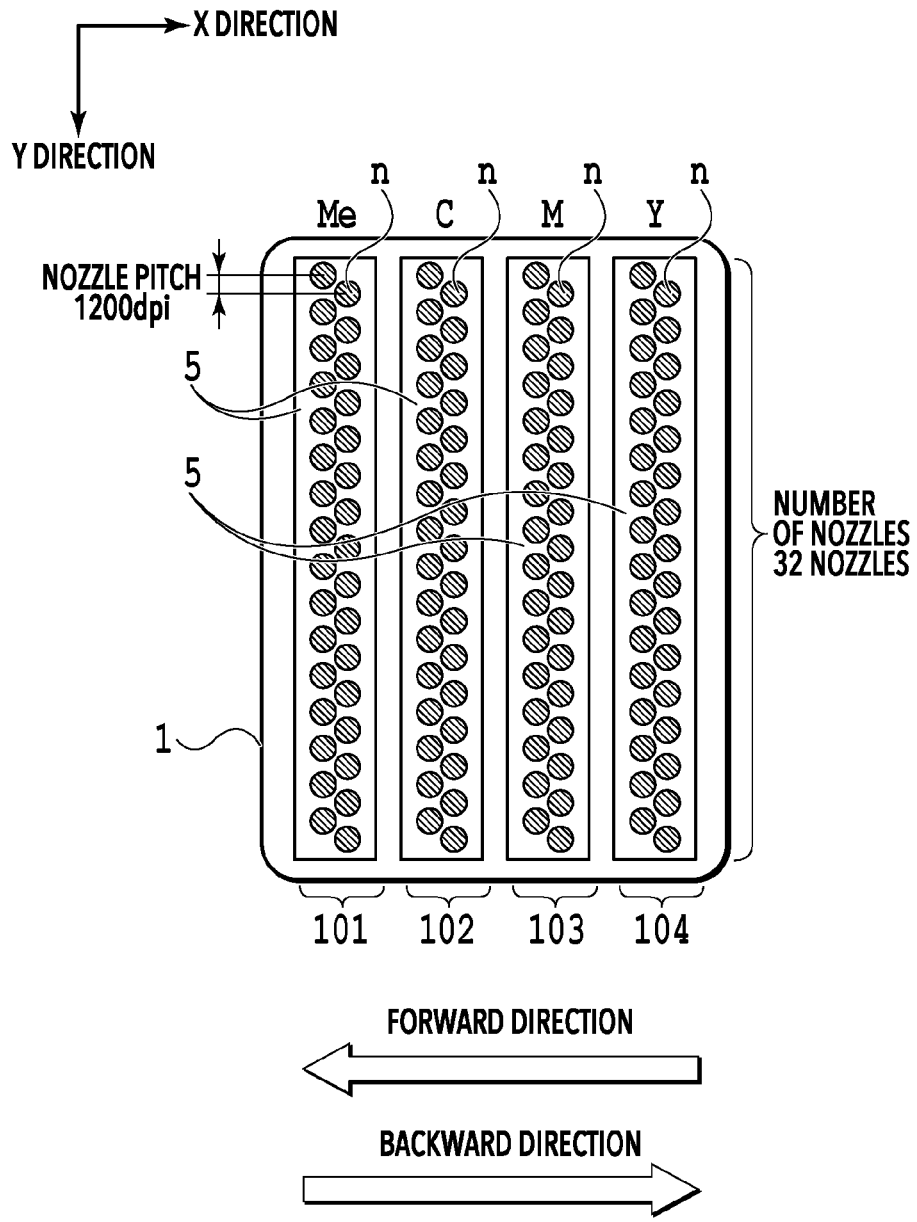
FIG. 2 is a diagram illustrating a print head according to the embodiment as viewed from an ejection port surface.

FIG. 2 is a diagram illustrating the print heads 5 provided in the carriage 1 as viewed from an ejection port surface (that is, from a direction opposite to the Z direction in FIG. 1). Each of the print heads 5 includes one of ejection port arrays 101 to 104 which are arranged in parallel in the X direction. In each of the ejection port arrays 101 to 104, a plurality of (here, n=32) ejection ports for ejecting ink as liquid droplets are arranged in a predetermined direction (the Y direction in FIG. 2; also referred to as an arrangement direction) at a pitch of 1200 dpi. Metallic (Me), cyan (C), magenta (M), and yellow (Y) inks are ejected from the ejection port arrays 101 to 104, respectively.

In this embodiment, the print heads 5 are provided for each ink color. However, the invention is not limited thereto. One print head may have a plurality of ejection port arrays that can eject a plurality of color inks.

<Control Unit>

Figure 3:
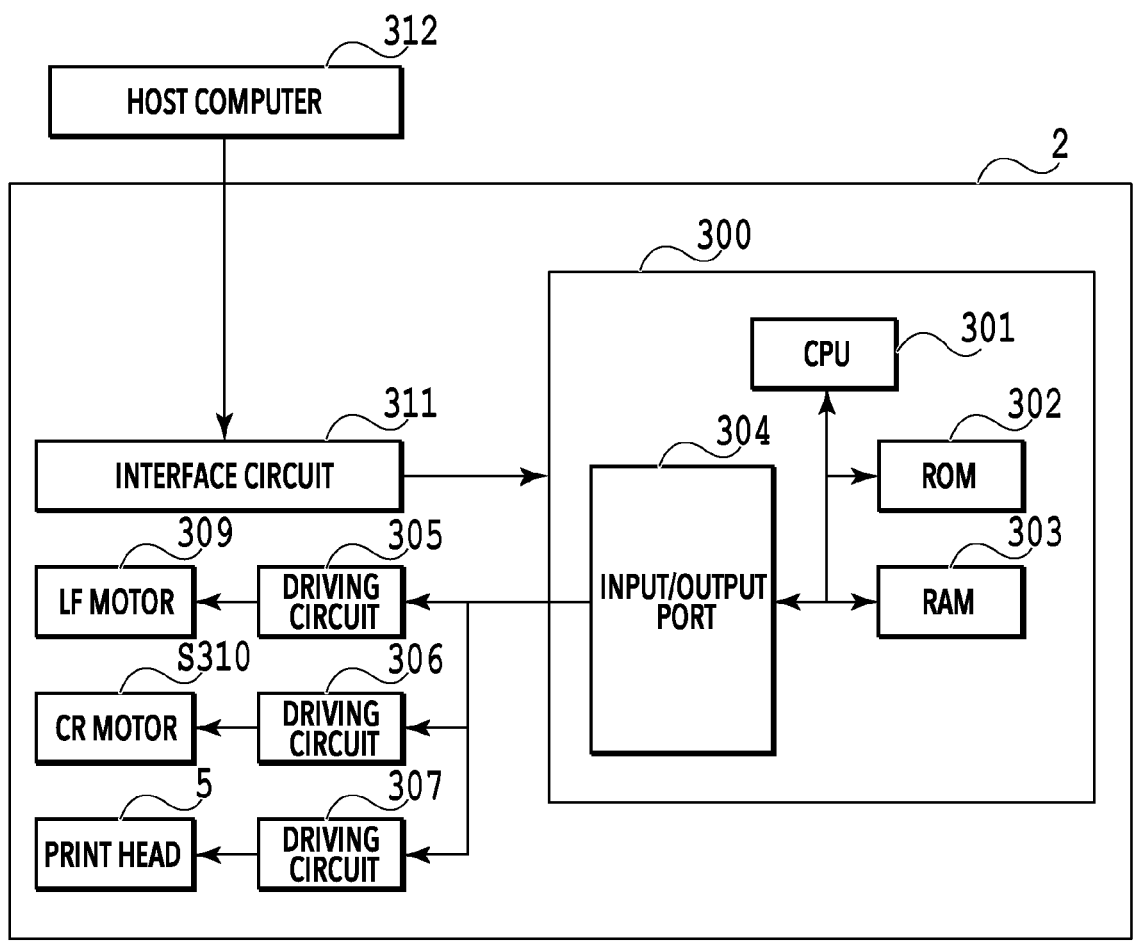
FIG. 3 is a block diagram schematically illustrating the configuration of a control system of the printing apparatus according to the embodiment.

FIG. 3 is a block diagram schematically illustrating the configuration of a control system (print control device) of the ink-jet printing apparatus 2. A main control unit 300 includes, for example, a CPU 301 that performs processing operations, such as calculation, selection, determination, and control, a ROM 302 that stores a control program to be executed by the CPU 301, a RAM 303 that is used as a print data buffer, and an input/output port 304. A driving circuit 305 that controls an LF motor 309 for transporting the print medium, a driving circuit 306 that controls a CR motor 310 for reciprocating the carriage 1, and a driving circuit 307 that drive (perform ejection control for) each print head 5 are connected to the input/output port 304. In addition, the main control unit 300 is connected to a host computer 312 through an interface circuit 311. The following characteristic control process of the invention is performed by a printer driver installed in the host computer 312 or is performed by the CPU 301 of the printing apparatus 2 according to the program or various parameters stored in the ROM 302.

<Print Data Generation Process>

Figure 4:
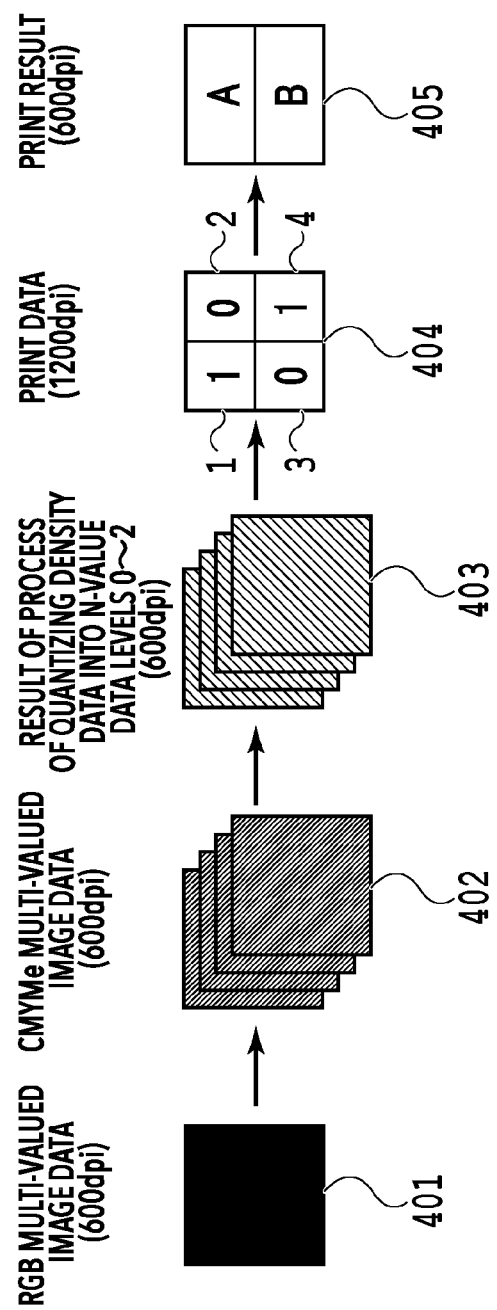
FIG. 4 is a diagram illustrating an image data conversion process performed by a control unit according to the embodiment.

FIG. 4 is a diagram illustrating an image data conversion process performed by the host computer 312 and the printing apparatus 2. Original image data 401 is 600-dpi RGB data. First, the printer driver converts the image data 401 into 600-dpi density data 402 corresponding to ink colors CMYMe used by the printing apparatus 2. Then, the printer driver performs data processing according to a multi-valued error diffusion method or a dither method to convert the CMYMe density data 402 into quantization data 403 with three levels (gradation values) of 0 to 2. Here, for example, data is quantized into three values. However, the quantization value N is not limited thereto. The host computer 312 transmits quantization data of each ink color to the printing apparatus 2.

In a case where the CPU 301 received ternary image data, the CPU 301 converts the 600-dpi quantization data 403 into 1200-dpi binary print data 404 with reference to a dot arrangement pattern that is stored in the ROM 302 in advance. In addition, the CPU 301 stores the print data in a print buffer prepared in the RAM 303. The print data is binary data that determines printing "1" or non-printing "0" for each of 2×2 pixels arranged at a pitch of 1200 dpi.

In a case where the print data corresponding to one or more printing scans is stored in the RAM 303, the CPU 301 performs a printing operation based on the print data 404 according to the program stored in the ROM 302. Specifically, the CPU 301 directs the print heads 5 to perform an ejection operation while reading the binary print data 404 corresponding to each printing scan. At that time, a print resolution in the main scanning direction may be 1200 dpi or 600 dpi. In a case where the print resolution is 600 dpi, as illustrated in a print result 405, dots corresponding to print data 1 and 2 which are arranged in the main scanning direction are printed so as to overlap each other at a pixel position A. In addition, dots corresponding to print data 3 and 4 are printed so as to overlap each other at a pixel position B. The CPU 301 directs the print heads 5 to perform an ejection operation on the basis of the print data 404 while controlling various motors through the input/output port 304 as needed. In this way, an image corresponding to one page is printed on the print medium.

<Multi-Pass Printing>

Next, multi-pass printing performed by the printing apparatus according to this embodiment will be described. The multi-pass printing is a printing method in which a printing scan is performed in the same unit area (hereinafter, also referred to as the same area) of the print medium a plurality of times to print an image.

Figure 5:
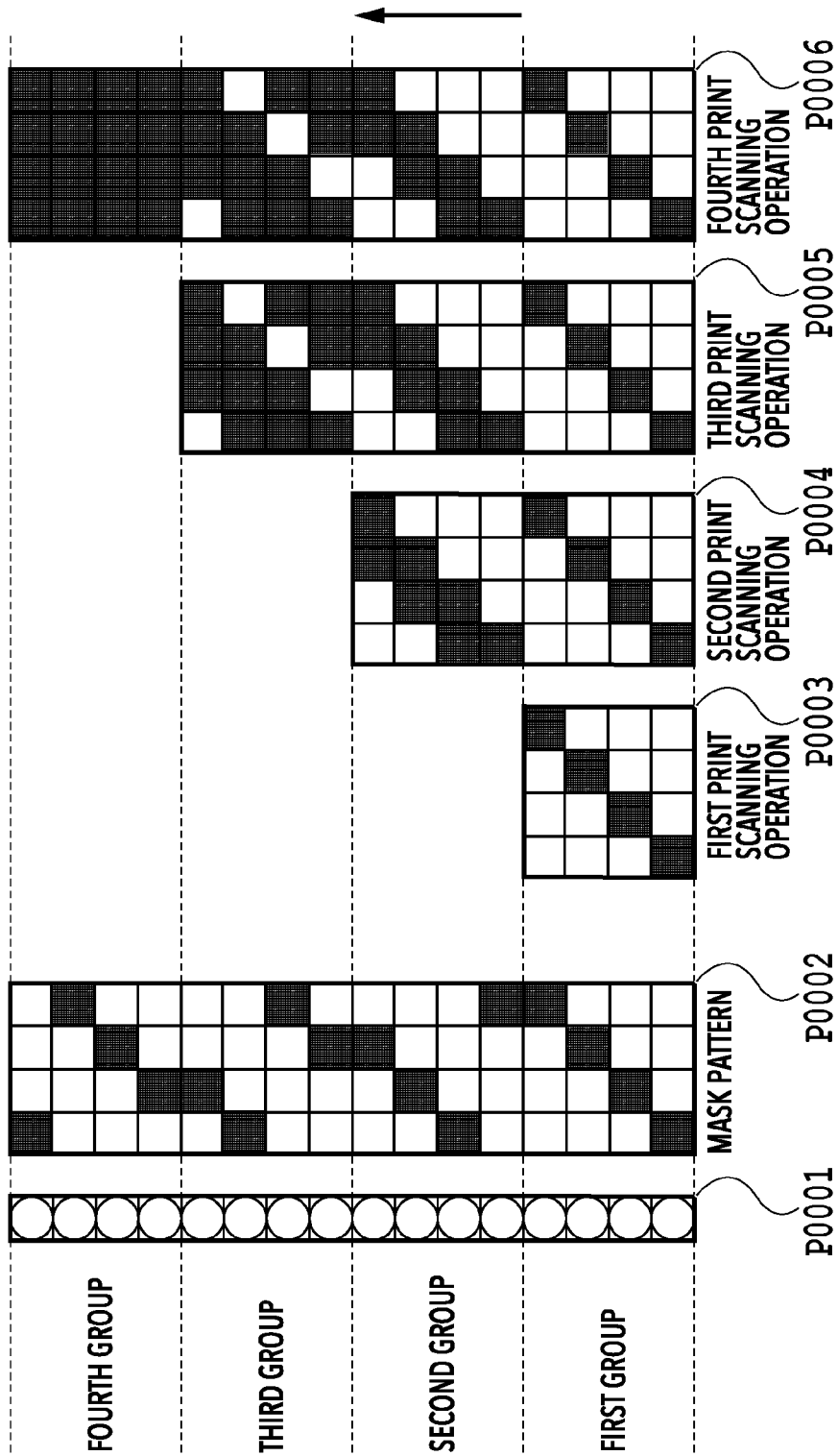
FIG. 5 is a diagram illustrating a multi-pass print mode of the printing apparatus according to the embodiment.

FIG. 5 is a diagram illustrating a mode in which the multi-pass printing is performed by four printing scans using a pass mask among the print modes performed by the printing apparatus according to this embodiment. FIG. 5 schematically illustrates, for example, the print head, a mask pattern of the pass mask, and a printed dot pattern in a case where an image is completely printed in the same area by four printing scans.

In FIG. 5, reference symbol P0001 indicates the print head. Here, for simplicity of illustration and description, the print head having 16 ejection ports (hereinafter, also referred to as nozzles) is illustrated. As illustrated in FIG. 5, a nozzle array is divided into four nozzles groups, that is, first to fourth nozzle groups, each of which includes four nozzles, and is used. Reference symbol P0002 indicates the mask pattern of the pass mask and a mask pixel (hereinafter, also referred to as a printing allowance pixel) that allows the printing of a pixel corresponding to each nozzle is illustrated in black. The mask patterns corresponding to the four nozzle groups complement each other. In a case where the four patterns overlap each other, all of 4×4 pixels become the printing allowance pixels. That is, the printing of an area of 4×4 pixels is completed by four patterns.

Reference symbol P0003 to P0006 indicate the formed dot arrangement patterns and indicate an aspect in which the printing scan is repeated to form an image. As illustrated in the patterns, in the multi-pass printing, dots are formed on the basis of the binary print data (dot data) generated by the mask patterns corresponding to each nozzle group in each printing scan. Then, whenever the printing scan ends, the print medium is transported in an arrow direction in FIG. 5 by a distance corresponding to the width of the nozzle group. As such, the printing of an image in the area corresponding to the width of each nozzle group on the print medium is completed by four printing scans.

<Metallic Ink>

(Metallic Particle)

The metallic ink used in this embodiment includes metallic particles. The content (mass %) of the metallic particles in the ink is preferably equal to or greater than 0.1 mass % and equal to or less than 30.0 mass % and more preferably equal to or greater than 1.0 mass % and equal to or less than 15.0 mass % with respect to the total mass of the ink.

The metallic particle is not particularly limited. Examples of the metallic particle include gold, silver, copper, platinum, aluminum, titanium, chromium, iron, nickel, zinc, zirconium, and tin particles. The metallic particles may be single metal particles, alloy particles, or a combination thereof. The metallic particles are preferably gold, silver, or copper particles and more preferably silver particles in terms of the preservation stability of the metallic particles and the gloss of a formed image. The silver particles improve the gloss of the formed image and are achromatic. Therefore, the silver particles are particularly superior in reproducing a metallic color in a wide range in a case where the silver particles are combined with a colored ink.

The average particle diameter of the silver particles used in this embodiment is preferably equal to or greater than 1 nm and equal to or less than 200 nm and more preferably equal to or greater than 10 nm and equal to or less than 100 nm in terms of the preservation stability of ink and the gloss of an image formed by the silver particles.

(Other Components)

The metallic ink used in this embodiment may include water as a solvent (ion-exchanged water) and various additives, such as a surfactant, a water-soluble organic solvent, a pH adjustment agent, an antirust agent, an antiseptic agent, a mildew proofing agent, an antioxidant, a reduction inhibitor, and an evaporation accelerator, in addition to the above-mentioned metallic particles.

Next, the formation state of dots on a print medium by the metallic ink which is one of the characteristics of the invention and the formation of a film by the metallic particles in the metallic ink will be described.

In the following embodiments, silver nano-ink (hereinafter, also referred to as "silver ink") including silver particles with a nano-order particle size which are dispersed in a solvent is given as an example of the metallic ink used.

Figure 6:
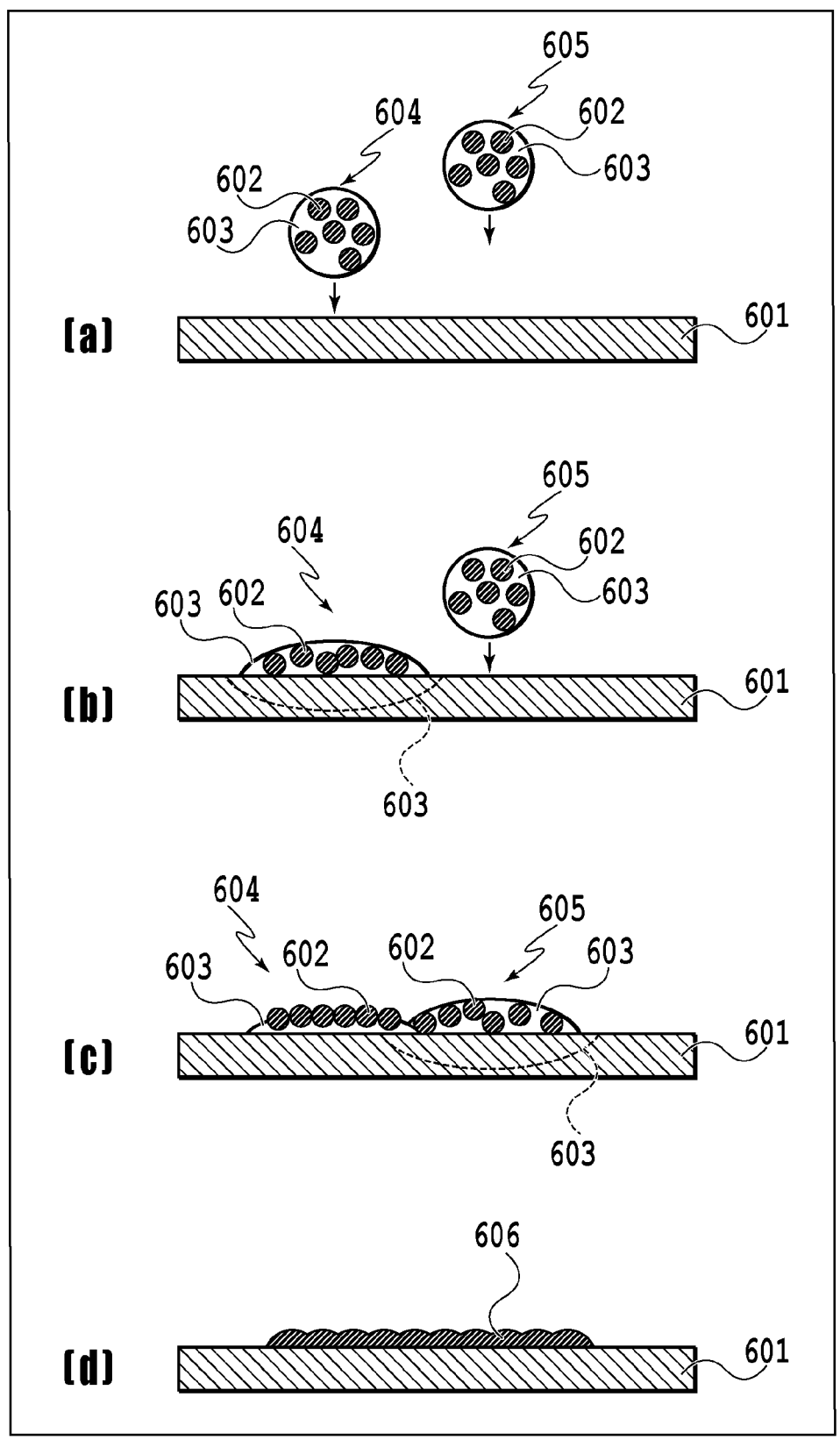
FIG. 6 is a diagram illustrating an example of the formation state of dots in a case where a plurality of silver ink droplets are ejected.

FIG. 6 is a diagram schematically illustrating the formation states of dots in a case where a plurality of silver ink droplets are ejected to a print medium.

FIG. 6 is a diagram illustrating a case in which, after a first ink droplet is ejected, a second ink droplet is ejected, as viewed from the cross-sectional direction of the print medium.

A part (a) of FIG. 6 illustrates a first ink droplet 604 ejected from a nozzle and a second ink droplet 605 ejected a predetermined time after the ejection of the first ink droplet 604, immediately before the ink droplets land on a print medium 601. Each of the ink droplets includes silver particles 602 and a solvent 603. In a state where the silver particles with a nano-order size are dispersed in the solvent, the silver particle does not look achromatic silver due to a plasmon effect.

Then, the first ink droplet 604 lands on the print medium 601 before the second ink droplet 605 lands (part (b) of FIG. 6). The solvent 603 in the first ink droplet 604 that lands first is infiltrated into the print medium, or is evaporated from the surfaces of the ink droplet, so that the amount of solvent is reduced. Accordingly, the silver particles 602 in the first ink droplet 604 come into contact with each other and the diameter of the silver particle increases or the shape of the silver particle changes. As a result, a silver particle film in which the silver particles are densely concentrated is formed in the vicinity of the surface of the print medium and the plasmon effect does not occur. Therefore, a silver color which is an achromatic color is exhibited (part (c) of FIG. 6).

In a case where the subsequent second ink droplet 605 lands in the vicinity of the first ink droplet 604 while the silver particle film is being formed by the previous first ink droplet 604, a silver particle film is formed with the infiltration or evaporation of the solvent in the second ink droplet 605 (part (c) of FIG. 6). At that time, in a case where the first ink droplet 604 that is forming the silver particle film and the second ink droplet 605 come into contact with each other, the ink droplets are easily combined to form a silver particle film 606 (part (d) of FIG. 6).

Figure 7:
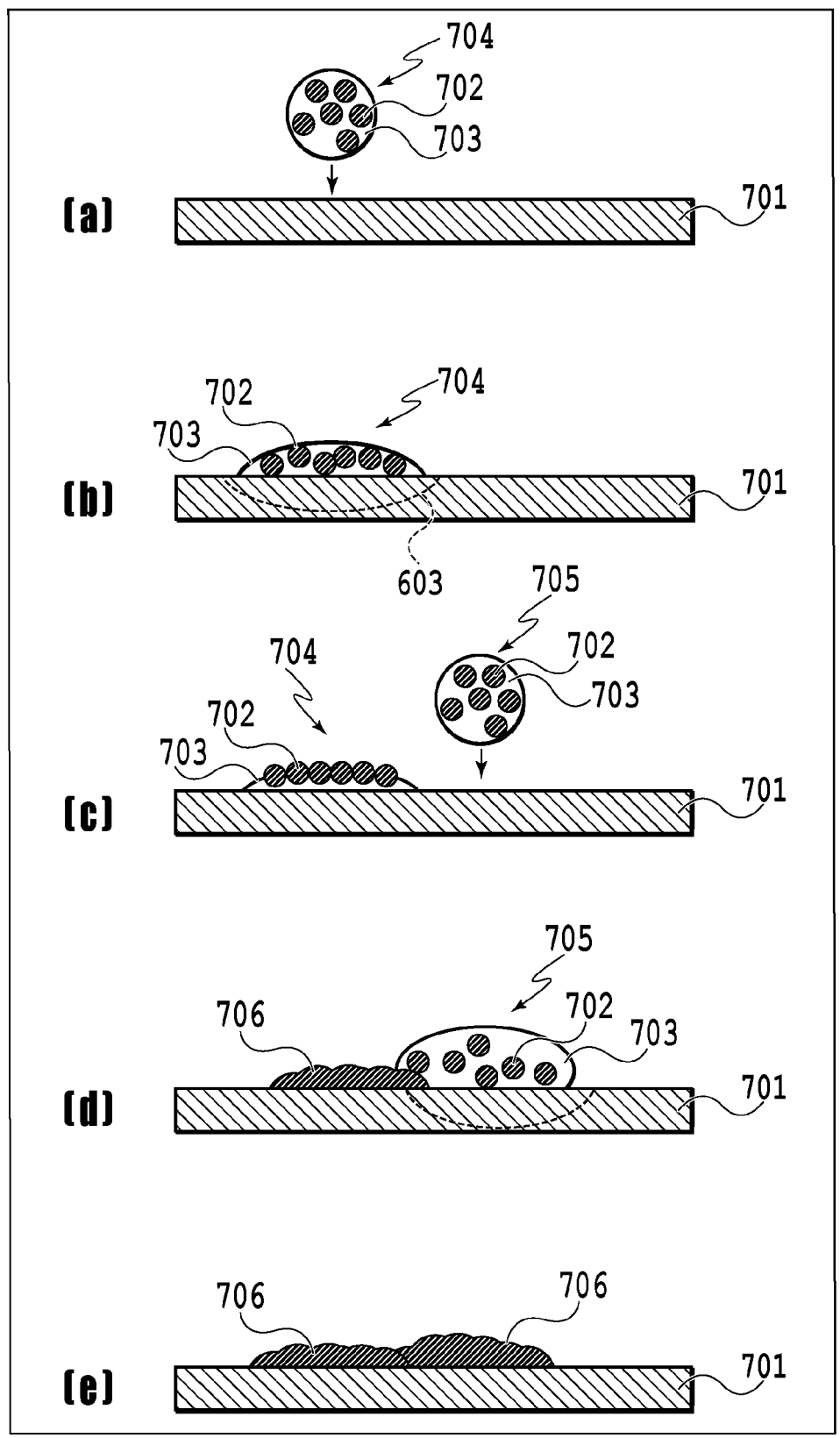
FIG. 7 is a diagram illustrating an example of the formation state of dots in a case where a plurality of silver ink droplets are ejected.

FIG. 7 is a diagram illustrating a case in which a second ink droplet is ejected after an elapse of certain time after a first ink droplet is ejected.

A part of FIG. 7 illustrates a first ink droplet 704 ejected from the nozzle and a part (b) of FIG. 7 illustrates a state in which a second ink droplet 705 is ejected after a predetermined time that is longer than that in the case illustrated in the part (a) of FIG. 6. Each of the ink droplets 704 and 705 includes silver particles 702 and a solvent 703, similarly to the case illustrated in FIG. 6. The first ink droplet 704 lands on a print medium 701 before the second ink droplet 705 lands (part (b) of FIG. 7). As illustrated in a part (c) of FIG. 7, in the first ink droplet 704 that lands first, the solvent is infiltrated or evaporated and the amount of solvent is reduced. With the reduction in the amount of solvent, the silver particles 702 form a silver particle film in the vicinity of the surface of the print medium, similarly to the case illustrated in FIG. 6. However, in a state where ink is ejected as illustrated in FIG. 7, after the previous ink droplet 704 forms a silver particle film in a dot shape, the subsequent second ink droplet 705 lands on the print medium (part (d) of FIG. 7). Therefore, the contact and combination of the ink droplets while dots are being formed as described in FIG. 6 do not occur and the first ink droplet 704 and the second ink droplet 705 individually form a silver particle film 706. In this case, since the second ink droplet 705 forms a silver particle film on the first ink droplet 704 in a portion in which the first ink droplet 704 and the second ink droplet 705 overlap each other, the unevenness of the surface is large (part (e) of FIG. 7).

As such, in the silver particle film formed on the print medium by the silver ink droplets, the unevenness of the surface varies depending on the magnitude (length) of a difference in landing time between a plurality of silver ink droplets. In a case where the difference in landing time is small (short), a smooth film with small surface unevenness is formed. Therefore, a metallic gloss is high. In a case where the difference in landing time is large (long), the unevenness of the surface is large and smoothness is low. Therefore, a metallic gloss is low.

In addition, the metallic gloss varies depending on the amount of silver ink droplets that are ejected at a time. Next, a difference in metallic gloss depending on the amount of ink ejected will be described.

Figure 8:
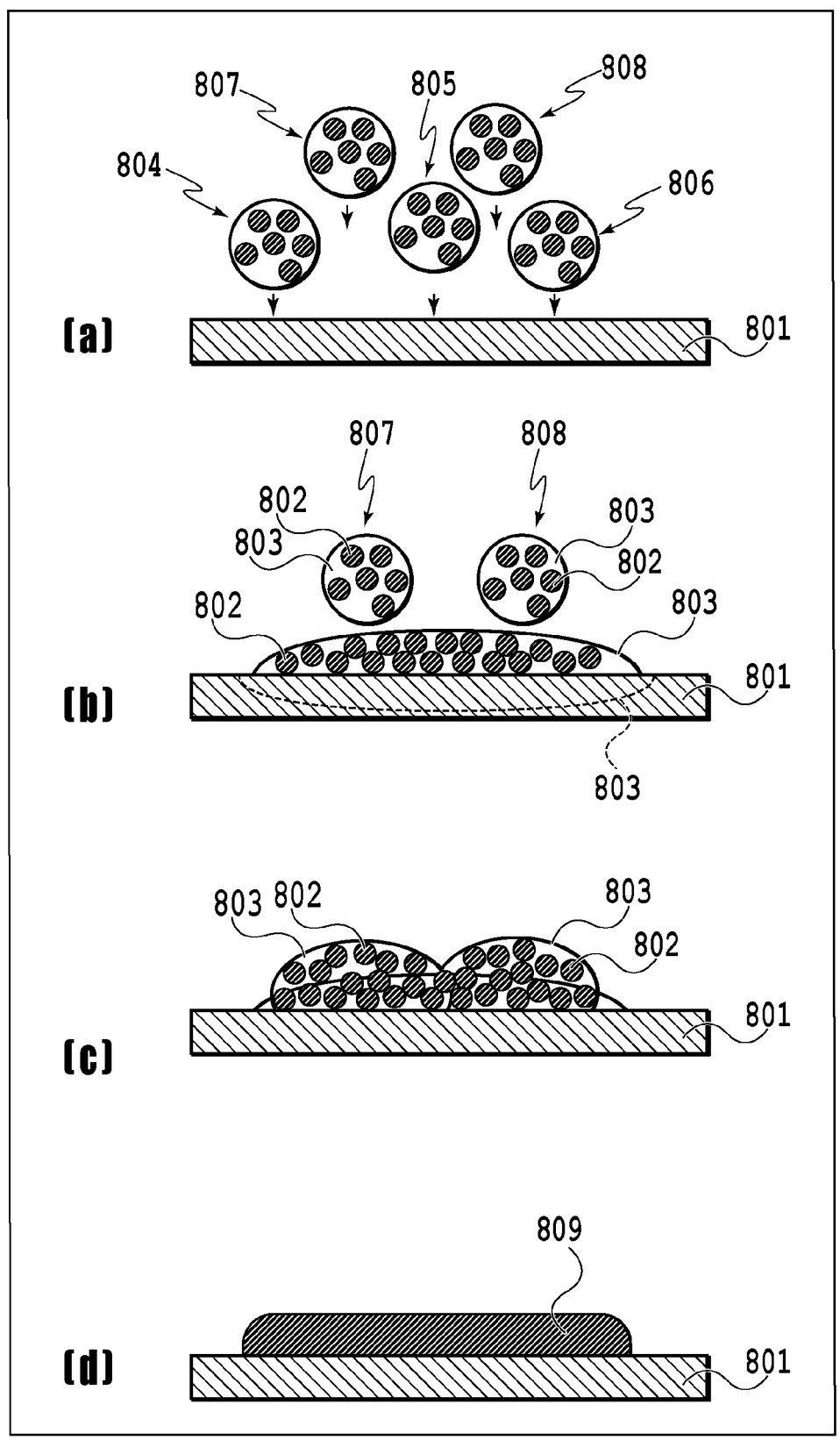
FIG. 8 is a diagram illustrating an example of the formation state of dots in a case where a plurality of silver ink droplets are ejected.

FIG. 8 is a diagrams schematically illustrating the formation state of dots in a case where a large number of silver ink droplets are ejected to a print medium at a time.

A part (a) of FIG. 8 illustrates first to fifth ink droplets 804 to 808 ejected from the nozzles before they land on a print medium 801. Similarly to FIG. 6, each ink droplet includes silver particles 802 and a solvent 803. In the example illustrated in FIG. 8, the amount of ink ejected is more than that in FIG. 6, a difference in the landing time between the ink droplets is less than that in FIG. 6, and the first to third ink droplets 804 to 806 land on the print medium 801 before the fourth ink droplet 807 and the fifth ink droplet 808 land (part (b) of FIG. 8). As illustrated in a part (b) of FIG. 8, in the first to third ink droplets 804 to 806 that land first, the silver particles start to come into contact with each other immediately after the first to third ink droplets land and a silver particle film is formed in the vicinity of the surface of the print medium with the infiltration or evaporation of the solvent, similarly to FIG. 6. Then, in a case where the fourth ink droplet 807 and the fifth ink droplet 808 land on the previous ink droplets, in the fourth ink droplet 807 and the fifth ink droplet 808, with the infiltration or evaporation of the solvent, the silver particles start to come into contact with each other and a silver particle film starts to be formed (part (c) of FIG. 8).

In this case, while the infiltration or evaporation of the solvents in the first to third ink droplets 804 to 806 has not yet ended, all of the ink droplets come into contact with each other. A large number of silver particle films are formed for a time that is longer than that in FIG. 6 and FIG. 7. Therefore, a silver particle film 809 that has small surface unevenness, is smooth, and has a high metallic gloss is formed (part (d) of FIG. 8).

The time (speed) required for a predetermined amount of solvent to be infiltrated into the print medium or to be evaporated is the same. Therefore, in a case where a large number of silver ink droplets are ejected at a time, the amount of ink per unit area increases and the time required for the solvent to be infiltrated and evaporated increases. In addition, since it takes a lot of time for the silver particles to be fixed on the print medium, the time for obtaining an opportunity at which the silver particles to come into contact with each other is long. As a result, a metal film is formed for a long time and the number of silver particles that contribute to producing a silver color increases. Therefore, a metallic gloss is improved.

As such, in a case where a printed matter is created by ejecting a plurality of silver ink droplets to form a silver particle film on the print medium using an ink-jet printing method, it is preferable that a print ratio is set to a high value in one printing scan to eject a large number of silver ink droplets in order to improve the production of a silver color and metallic gloss. In other words, in a case where a silver ink is used, it is effective to eject ink using a printing scan in which a high print ratio that is not set in normal color ink or clear ink is set, in order to produce a silver color. For example, in a case where the print ratio of a specific pass is set to a significantly high value in a printing method using normal color ink and clear ink as in Japanese Patent No. 5539118, image deterioration, such as density unevenness or bleeding, is likely to occur in a color image. In contrast, in a case where printing is performed using the silver ink according to this embodiment, the image deterioration does not occur even if the print ratio of a specific pass is set to a significantly high value.

By the way, in a print head of an ink-jet printing apparatus including a plurality of nozzles, there is a difference in the amount of ink ejected from each nozzle and a difference (deviation) in the landing position of an ink droplet due to a manufacturing tolerance. The difference in the amount of ink ejected and the deviation of the landing position of the ink droplet in the ejection direction cause the deterioration of image quality. It is preferable to use multi-pass printing in order to prevent the deterioration of image quality as described above. That is, in the multi-pass printing, a plurality of printing scans are performed to print an image in the same unit area. Therefore, the influence of the difference in the amount of ink ejected from each nozzle and the deviation is averaged and the density unevenness of a print image is reduced.

In this embodiment, among a plurality of passes in the multi-pass printing, a printing pass (first scan) with a function of improving the production of a silver color and a metallic gloss and a printing pass (second scan) with a function of reducing density unevenness caused by a variation in the manufacture of nozzles of the print head are set. A method for setting the print ratios of these passes (first and second scans) and a printing order will be described in detail with reference to specific examples.

Printing by the printing apparatus according to this embodiment is achieved by the print data generation method illustrated in FIG. 4.

First Embodiment

In a first embodiment of the invention, the number of passes in multi-pass printing using silver ink including silver particles is 4. In particular, the print ratio of a fourth pass is set to a high value.

Figure 9A:
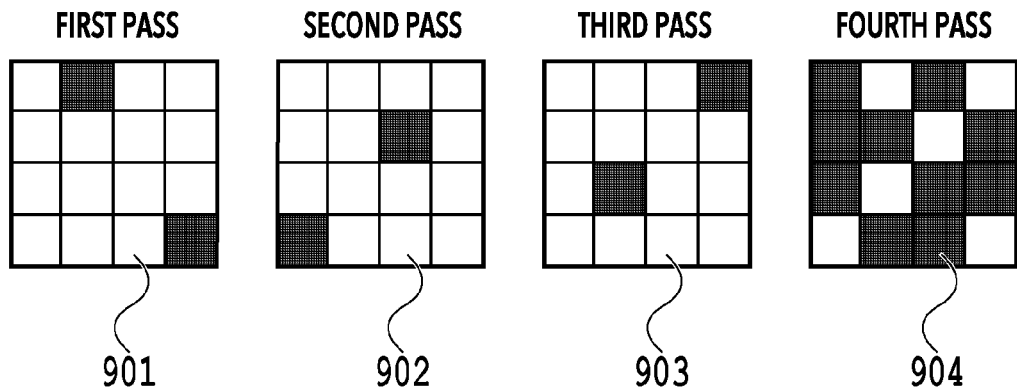
FIG. 9A is a diagram illustrating an example of masks for four passes in the embodiment.

A characteristic mask pattern used in this embodiment will be described with reference to FIGS. 9A and 9B. FIG. 9A illustrates mask patterns 901, 902, 903, and 904 for the first to fourth passes as mask patterns for four passes. The printing allowance pixel, that is, the pixel to which ink is ejected is a black pixel.

Figure 10:
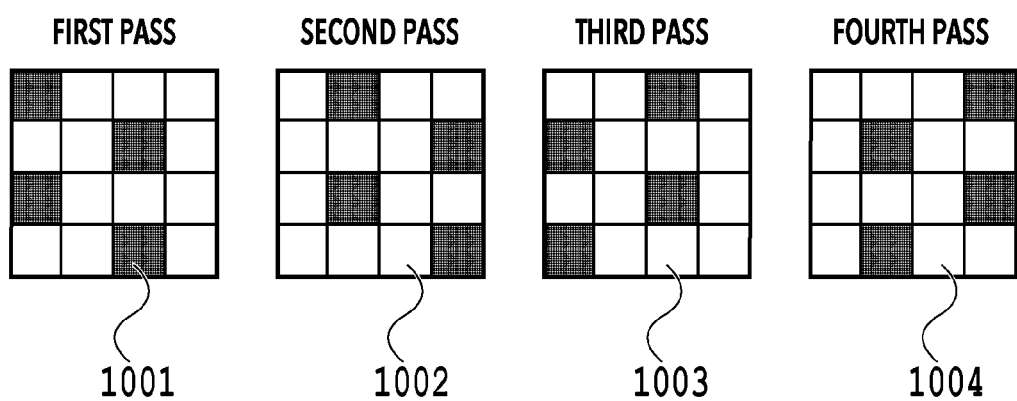
FIG. 10 is a diagram illustrating an example of general masks for four passes.

FIG. 10 illustrates mask patterns 1001, 1002, 1003, and 1004 for the first to fourth passes as general mask patterns for four passes.

The mask patterns according to this embodiment illustrated in FIG. 9A are different from the general mask patterns illustrated in FIG. 10 in the following points. That is, in the first to third passes of the mask patterns according to this embodiment, the printing allowance pixels are two pixels among all of the print pixels (16 pixels) and the print ratio is set to a low value of 12.5%. In the fourth pass, the printing allowance pixels are 10 pixels and the print ratio is set to a high value of 62.5%. That is, the print ratios of all of the four passes are a plurality of types and are not uniform. In addition, in this embodiment, the print ratio of one pass among the four passes is set to be higher than that of the other passes.

Hereinafter, among a plurality of passes (printing scans), a pass having a higher print ratio than the other passes is referred to a "pass (printing scan) with a high print ratio" or a "first scan". In such a first scan, one printing scan or a plurality of printing scans may be included. In a case where the first scan includes a plurality of printing scans, the print ratios of the printing scans may be equal to each other or may be different from each other. In addition, a pass with a print ratio (a relatively low print ratio) that is different from that of the first scan is referred to as a "pass (printing scan) with a low print ratio" or a "second scan".

In the general mask patterns illustrated in FIG. 10, the printing allowance pixels in each pass are four pixels and the print ratios are equally set to 25%. In this embodiment, the mask pattern illustrated in FIG. 9A is used as a mask pattern for silver ink (Me) and the general mask patterns illustrated in FIG. 10 are used as mask patterns for the other color inks (CMY).

A method for calculating the print ratio of the fourth pass (the pass with a high print ratio (first pass)) in the mask patterns illustrated in FIG. 9A will be described below. A reference print ratio is calculated from a dot size (an area covered by a dot) that is formed on a print medium by one ink droplet and a unit area on the print medium. In this embodiment, the diameter of a dot formed by one silver ink droplet is 61.0 µm, that is, the radius of the dot is 30.5 µm. In addition, the unit area of a 600-dpi (42.3 µm) unit grid on the print medium is about 1789.3 µm². A minimum print ratio (target print ratio) k required to cover the total area (unit area) of the unit grid with dots can be calculated by the following Expression (1):

$$k=1789.3/(30.5\times30.5\times3.14)=0.613 \quad \text{Expression (1)}$$

The print ratio of the pass (first scan) with a high print ratio is set to be equal to or greater than a target print ratio k of 61.3%. In this case, even if ink droplets are simultaneously ejected in the first scan so as to dispersively form dots on the print medium, the ink droplets certainly come into contact with each other. For this reason, in this embodiment, the print ratio of the pass with a high print ratio is set to 62.5% that is higher than the target print ratio k (61.3%). In addition, for the print ratios of the first to third passes (second scan) with a low print ratio, the remainder of 37.5% is equally divided. Each of the print ratios of the first to third passes is set to 12.5%.

The mask patterns illustrated in FIG. 9A to which the print ratios have been set as described above are applied as the mask patterns for silver ink.

Figure 9B:
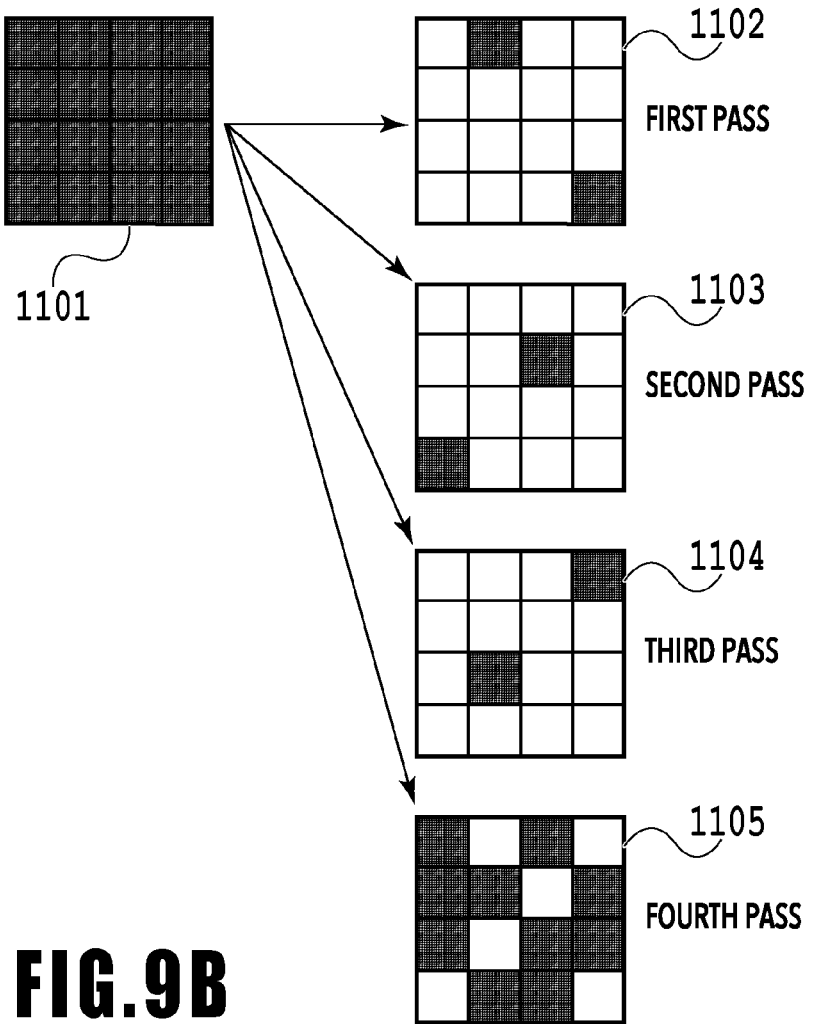
FIG. 9B is a diagram illustrating an example of a print data generation process.

FIG. 9B is a diagram illustrating a process for generating the print data of each pass from the print data generated by the print data generation process flow illustrated in FIG. 4, using the mask patterns illustrated in FIG. 9A.

FIG. 9B illustrates print data 1101 for silver ink obtained by binarizing a so-called solid image in which dots are formed on all print pixels. A masking process is performed for the print data 1101 using the mask patterns 901 to 904 illustrated in FIG. 9A to generate print data 1102, 1103, 1104, and 1105 of each pass. Since the print data 1101 is used for a solid image, the print data of each pass corresponds to the mask patterns illustrated in FIG. 9A.

Next, an aspect in which the print head sequentially ejects silver ink droplets corresponding to the print data of each pass to apply silver ink to a print medium will be described.

Figure 11:
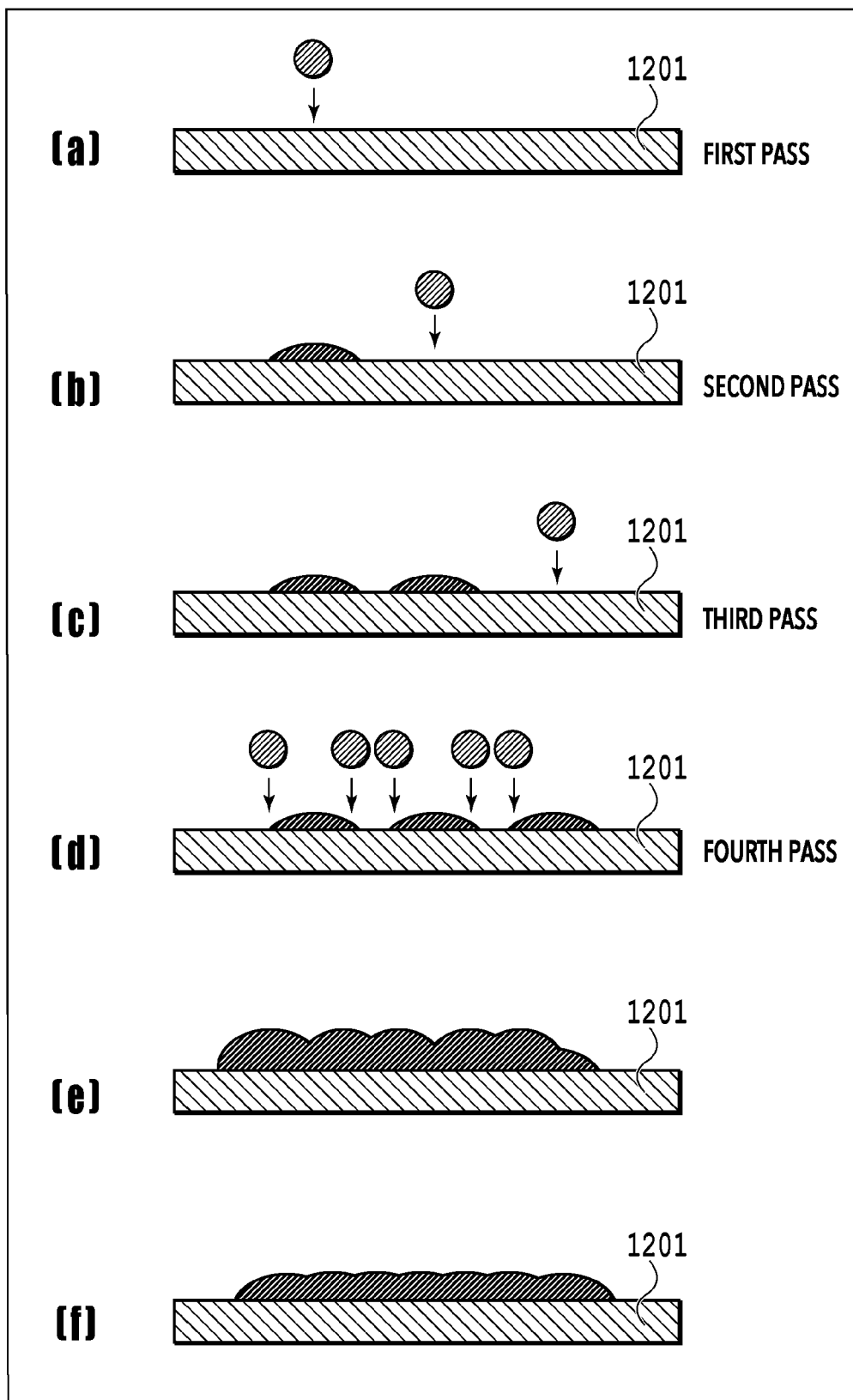
FIG. 11 is a diagram schematically illustrating an example of an aspect in which a silver particle film is formed on a print medium in the embodiment.

FIG. 11 including parts (a) to (f) is a diagram schematically illustrating an aspect in which a silver particle film is formed on a print medium in a case where the print head ejects silver ink droplets on the basis of the print data of each pass illustrated in FIG. 9B. The silver ink ejected in each pass forms a silver particle film on the print medium according to the amount of ink ejected and the difference in landing time, as described with reference to FIGS. 6 to 8.

As the time for contact silver particles with each other becomes longer, that is, the time until the infiltration of a solvent in ink into the print medium or the evaporation of the solvent ends becomes longer, a metal film formed by the silver particles has higher density. Therefore, a silver particle film with a high metallic gloss is formed.

The parts (a) to (d) of FIG. 11 illustrate a state immediately before the silver ink ejected from the print head in each pass lands on a print medium 1201. The time difference between the passes is about 300 msec. The time from the landing of ink-jet ink including the silver ink used in this embodiment on a print medium to the end of the infiltration of a solvent in the ink into the print medium is about several tens of milliseconds per droplet. As illustrated in the parts (a)

to (c) of FIG. 11, since the number of ink droplets ejected (applied) in each of the first to third passes is small, the infiltration of ink ejected in the previous pass into the print medium almost ends before ink is ejected in the subsequent pass. Similarly, as illustrated in the part (d) of FIG. 11, before ink is ejected in the fourth pass, the infiltration of the ink droplets ejected up to the third pass into the print medium almost ends. Since the number of ink droplets ejected in the fourth pass is large, the infiltration of the solvent in the ink droplets into the print medium starts in a state where the ink droplets come into contact with each other, as illustrated in the part (e) of FIG. 11. In the fourth pass, since the amount of ink ejected is large, the time until the infiltration or the solvent into the print medium or the evaporation of the solvent ends is long. Therefore, the formation of a metal film by the silver particles progresses and a silver particle film with a high metallic gloss is formed (part (f) of FIG. 11).

The influence of a difference in the amount of ink ejected from each nozzle and the deviation of the landing position of the ink in the ejection direction is averaged by the multi-pass printing and the density unevenness of a print image is reduced. Since the contact time of the silver particles in the fourth pass is maintained for a long time, the formation of a metal film by the silver particles progresses and an image with a high metallic gloss is printed. As such, in this embodiment, it is possible to print an image with a high metallic gloss and small density unevenness.

In this embodiment, the pass (first scan) with a high print ratio illustrated in the part (d) of FIG. 11 is set to print an image with a high metallic gloss. The print ratio of the pass with a high print ratio is not limited to the print ratio set in this embodiment. As described above, it is important to increase the number of ink droplets that come into contact with each other at the same time in order to increase a metallic gloss. Therefore, it is effective to increase the print ratio of the first scan. It is not preferable that the print ratio of the first scan is too low. The print ratio of the first scan may be a value at which a silver particle film with an allowable metallic gloss level can be formed. It is preferable that the print ratio for bringing a large number of ink droplets into contact with each other at the same time is set to a value that is equal to or greater than half the sum (total print ratio) of the print ratios of each pass such that an allowable metallic gloss level is obtained.

In this embodiment, the pass with a high print ratio among four passes is the fourth pass. However, the pass with a high print ratio is not limited to the fourth pass. The pass with a high print ratio may be set to any one of the first to third passes. In this case, similarly, the contact time of the silver particles increases and the formation of a metal film by the silver particles progresses to increase a metallic gloss. In a case where the pass with a high print ratio is set to any one of the first to third passes, a metallic gloss is slightly lower than that in case where the pass with a high print ratio is set to the fourth pass, but it is possible to obtain a sufficiently allowable metallic gloss. Therefore, it is possible to change the order of the passes including the pass with a high print ratio.

In this embodiment, for the passes (second scans) other than the pass (first scan) with a high print ratio, the total print ratio of the passes other than the pass with a high print ratio is equally divided. For the second scans, different print ratios may be set. Since the second scan has a function of reducing density unevenness, it is preferable to set the print ratio capable of reducing density unevenness. In some case, the print ratio may be set to 0% at which no ink is ejected. However, in a case where all of the print ratios of the second scans are set to 0%, printing is substantially the same as one-pass printing and the function of reducing density unevenness is not achieved, which is not preferable. In addition, it is not preferable that the print ratios of the second scans are close to 0% without limit for the same reason. Therefore, it is preferable that the second scan with the function of reducing density unevenness is performed at least one time among all of the printing scans and the print ratios of the second scans are at least one type. In addition, it is preferable that the sum of the print ratios of the second scans with the function of reducing density unevenness is set to a ratio that is less than half the total print ratio. That is, it is preferable that the sum of the print ratios of the second scans is not greater than the sum of the print ratios of the first scans. For the print ratios of the second scans, the difference between the print ratios of each pass and a difference in effect will be described in the following other embodiments.

In the multi-pass printing, the number of passes is not limited to four and may be appropriately changed. In addition, the pass (first scan) with a high print ratio is not limited to one (one pass) of the passes. The print ratios of two or more passes may be set to a high value.

The configuration in which the print ratios of a plurality of passes are set to a high value can be applied as long as a sufficiently allowable metallic gloss is obtained even if a metallic gloss is less than that in a case where one pass (first scan) has a high print ratio. In this case, the sum of the print ratios of a plurality of first scans is preferably set so as to be equal to or greater than the print ratio in a case where the first scan is performed once, that is, the print ratio calculated by the above-mentioned Expression (1). In this case, it is preferable that each of the print ratios of the plurality of first scans is greater than a value in a case where the print ratios of all passes are equal to each other. The reason is as follows. In a case where each of the print ratios of the plurality of first scans is equal to the value in a case where the print ratios of all passes are equal to each other, the amount of ink ejected per pass is small and the contact between the ink droplets is reduced. As a result, a silver particle film with a low metallic gloss is formed.

It is preferable that two or more passes as the passes (first scans) with a high print ratio are successive in order to accelerate the contact between the ink droplets and the formation of a silver particle film.

As such, in a case where two or more first scans are set, it is preferable that the print ratio of the first scan is greater than a value in a case where all of the passes have the same print ratio. In addition, it is more preferable that the sum of the print ratios of a plurality of first scans is equal to or greater than the print ratio in a case where the number of first scans is one. It is preferable that two or more first scans are successively performed.

In this embodiment, a case where the original multi-valued data is processed into binary data and then print data applied to each pass using the mask patterns is generated has been described. However, other methods can be used as the method for generating the print data of each pass. For example, a method may be applied which generates the multi-valued data of each process from the original multi-valued data and binarizes the multi-valued data of each pass to generate print data. In addition, the print medium used is not particularly limited. Any print medium can be used as long as a silver particle film is formed on the print medium by the silver ink used and a sufficiently high metallic gloss is obtained.

Second Embodiment

In a second embodiment, similarly to the first embodiment, the number of passes in multi-pass printing is four and the print ratio of the fourth pass is set to be higher than that in the first embodiment.

Figure 12A:
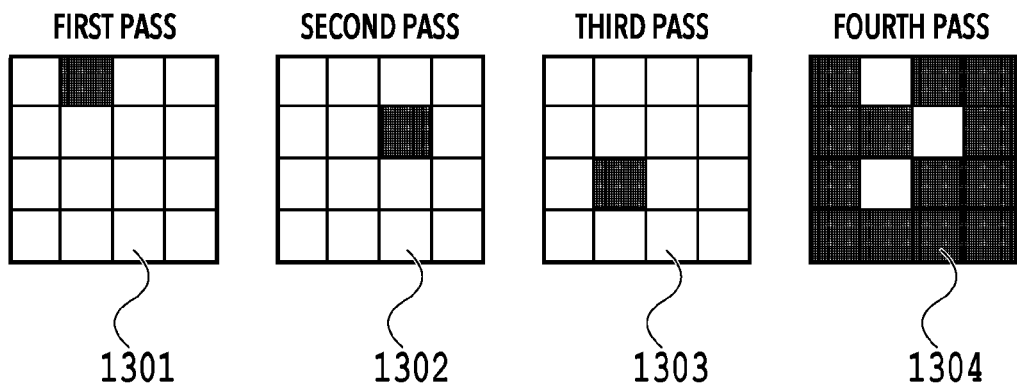
FIG. 12A is a diagram illustrating an example of masks for four passes in the embodiment.

FIG. 12A illustrates mask patterns 1301, 1302, 1303, and 1304 for first to fourth passes as mask patterns for four passes. A black pixel is the printing allowance pixel.

In the mask patterns 1301, 1302, and 1303 for the first to third passes, the printing allowance pixel is one pixel among all print pixels (16 pixels) and the print ratio is set to 6.25% that is less than that in the first embodiment. In the mask pattern 1304 for the fourth pass, the printing allowance pixels are 13 pixels and the print ratio is set to 81.25% that is higher than that in the first embodiment.

Figure 12B:
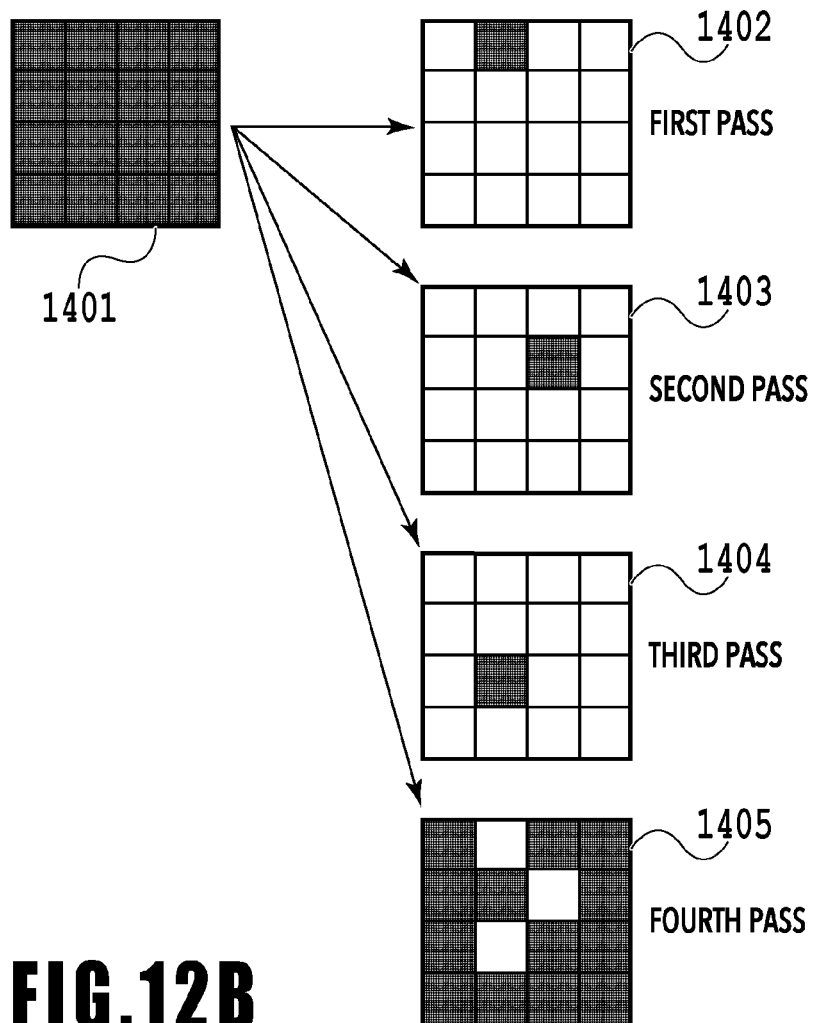
FIG. 12B is a diagram illustrating an example of a print data generation process.

FIG. 12B is a diagram illustrating a process for generating the print data of each pass from the print data generated by the same method as that in the first embodiment, using the mask patterns illustrated in FIG. 12A.

FIG. 12B illustrates print data 1401 for silver ink obtained by binarizing a solid image in which ink is ejected to all print pixels. A masking process is performed for the print data 1401 using the mask patterns 1301 to 1304 illustrated in FIG. 12A to generate print data 1402, 1403, 1404, and 1405 of each pass. This embodiment is the same as the first embodiment except that the print ratio of each pass is different from that in the first embodiment.

For ink droplets ejected in the first to third passes, the influence of a difference in the amount of ink ejected from each nozzle and the deviation of the landing position of ink in the ejection direction is averaged by the effect of the multi-pass printing and the density unevenness of a print image is reduced. Since the contact time of the silver particles in the fourth pass is maintained for a long time, the formation of a metal film by the silver particles progresses and a metallic gloss is improved. In particular, since the print ratio of the fourth pass is higher than that in the first embodiment, the effect of reducing density unevenness is slightly reduced, but a metallic gloss can be higher than that in the first embodiment. In this embodiment, it is possible to print an image with a high metallic gloss and small density unevenness.

Third Embodiment

In a third embodiment, similarly to the first embodiment, the number of passes in multi-pass printing is four, the print ratio of the first pass is set to a high value, and the print ratios of the second to fourth passes are set to a lower value.

Figure 13A:
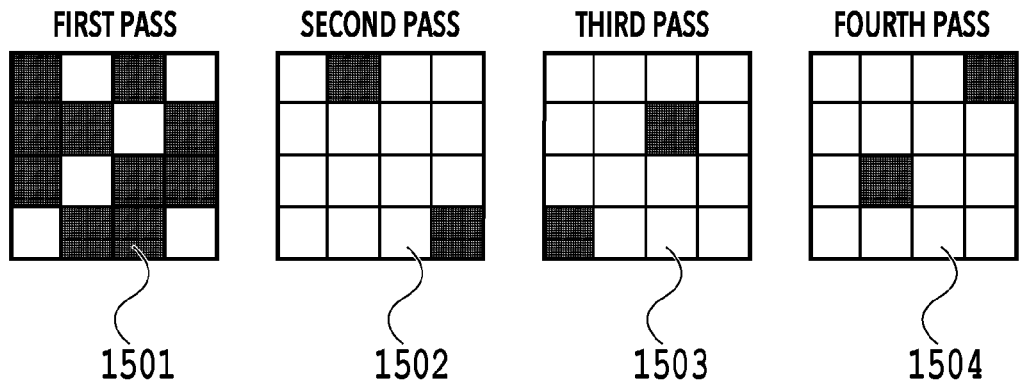
FIG. 13A is a diagram illustrating an example of masks for four passes in the embodiment.

FIG. 13A illustrates mask patterns 1501, 1502, 1503, and 1504 for first to fourth passes as mask patterns for four passes. A black pixel is the printing allowance pixel. In the mask pattern 1501 for the first pass, the printing allowance pixels are 10 pixels among all print pixels (16 pixels) and the print ratio is set to a high value of 62.5%. In the mask patterns for the second to fourth passes, the printing allowance pixels are two pixels and the print ratio is set to a low value of 12.5%.

Figure 13B:
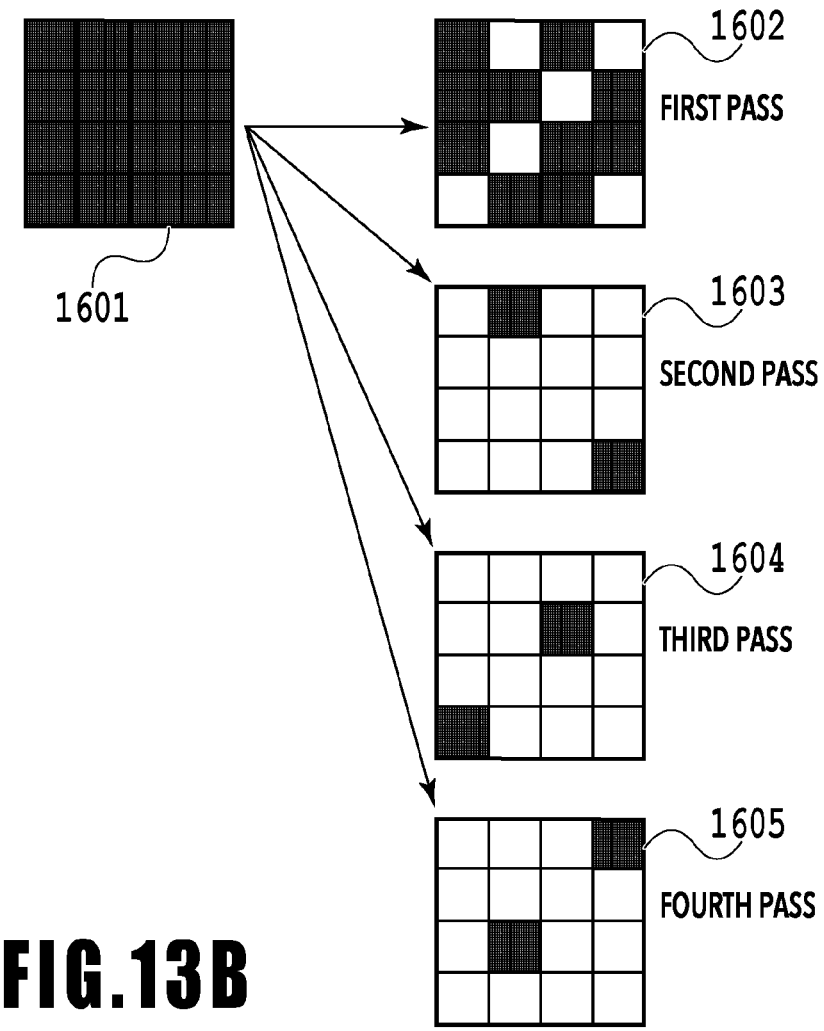
FIG. 13B is a diagram illustrating an example of a print data generation process.

FIG. 13B illustrates print data 1601 for silver ink obtained by binarizing a solid image in which ink is ejected to all print pixels. A masking process is performed for the print data 1601 using the mask patterns 1501 to 1504 illustrated in FIG. 13A to generate print data 1602, 1603, 1604, and 1605 of each pass.

Figure 14:
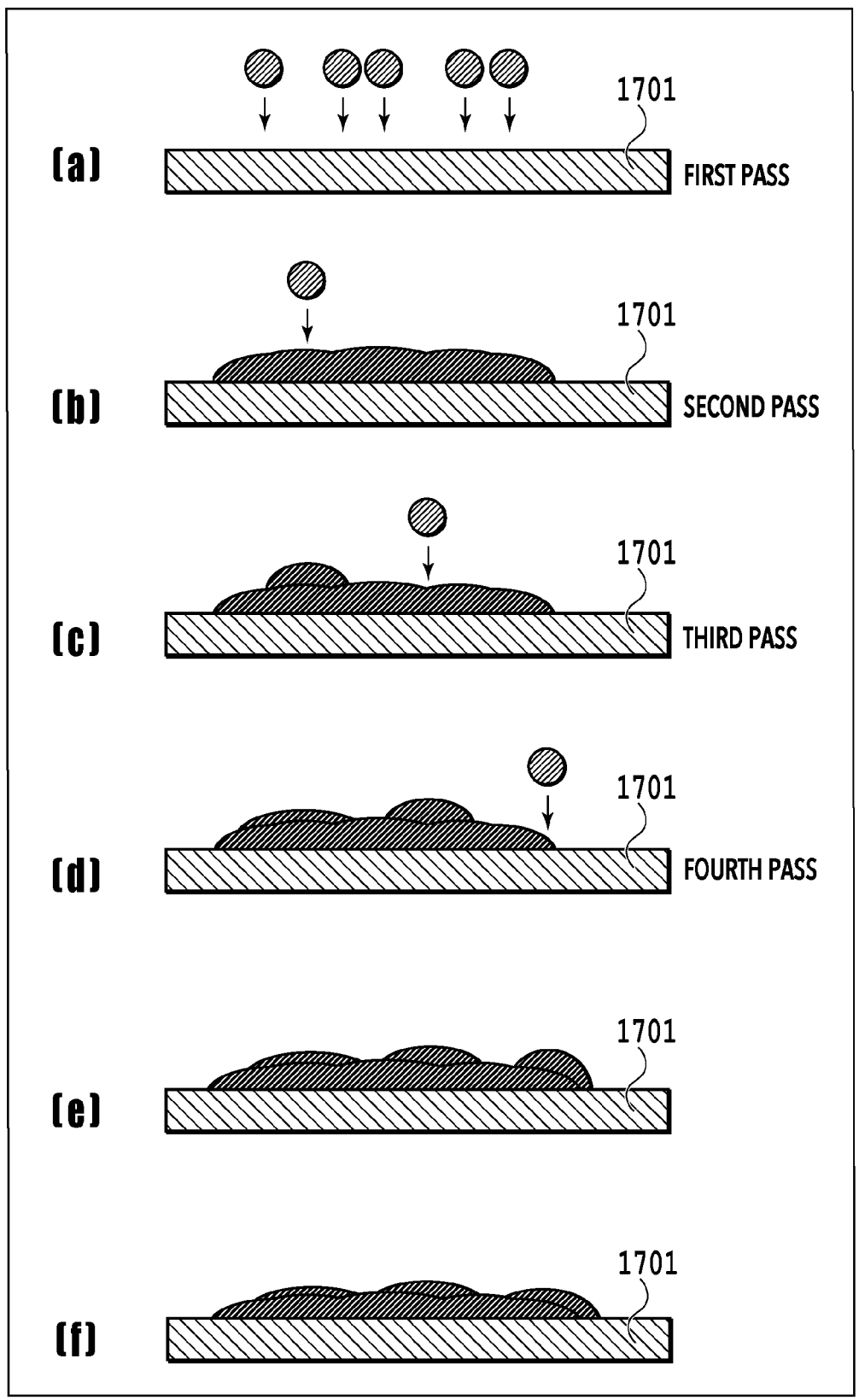
FIG. 14 is a diagram schematically illustrating an example of an aspect in which a silver particle film is formed on a print medium in the embodiment.

Parts (a) to (f) of FIG. 14 are diagrams illustrating an aspect in which a print head ejects silver ink on the basis of the print data of each pass illustrated in FIG. 13B to form a silver particle film on a print medium 1701. The pairs (a) to (d) of FIG. 14 illustrate a state immediately before the silver ink ejected from the print head in each pass lands on the print medium 1701. Similarly to the first embodiment, the time difference between the passes is about 300 msec and the time from the landing of the silver ink on the print medium to the end of infiltration of a solvent in the ink into the print medium is about several tens of milliseconds per droplet.

As illustrated in the part (a) of FIG. 14, a large number of ink droplets are ejected (supplied) in the first pass. Therefore, in a case where the ink droplets land on the print medium 1701, the ink droplets come into contact with each other and the infiltration of a solvent in the ink into the print medium starts as illustrated in the part (b) of FIG. 14. As illustrated in the part (b) of FIG. 14, a small number of ink droplets are ejected in the second pass. However, the infiltration of the solvent in the ink ejected in the first pass into the print medium has not yet ended, all of the ink droplets come into contact with each other, and the solvent remains on the print medium. Therefore, the ink droplets ejected in the second pass, which have come into contact with the ink droplets ejected in the first pass, start to be infiltrated and the formation of a metal film by some silver particles progresses.

As illustrated in the parts (c) and (d) of FIG. 14, before ink droplets are ejected in the third and fourth passes, the infiltration of the ink ejected in the previous passes into the print medium almost ends. Since the number of ink droplets ejected in the third and fourth passes is small, these ink droplets do not come into contact with each other and the infiltration of the solvent in the ink into the print medium starts. As a result, the shape of dots corresponding to the ink droplets which have been ejected in the third and fourth passes remains (part (e) of FIG. 14). Then, a silver particle film is formed by, for example, the evaporation of the solvent in the ink a d the like (part (f) of FIG. 14).

Since the contact time of the silver particles in the first pass is maintained for a long time, the formation of a metal film by the silver particles progresses and a high metallic gloss is obtained. In addition, for the ink droplets ejected in the second to fourth passes, the influence of a difference in the amount of ink ejected from each nozzle and the deviation of the landing position of ink in the ejection direction is averaged by the effect of the multi-pass printing and an image with small density unevenness is printed. Since a metal film is formed by the ink droplets ejected in the second to fourth passes in a state where the shape of dots remains, a metallic gloss is slightly lower than that in the first embodiment, but an image whose density unevenness has been significantly reduced is printed. In this embodiment, it is possible to print an image with a sufficiently high metallic gloss and small density unevenness.

The comparison between the first embodiment and the third embodiment shows that the execution of the first scan with a high print ratio in the second half of a plurality of printing scans rather than in the first half is also effective in improving a metallic gloss.

Fourth Embodiment

In a fourth embodiment, the number of passes in multi-pass printing is four similarly to the first embodiment and the print ratios of the first to third passes are set to different values unlike the first embodiment.

Figure 15A:
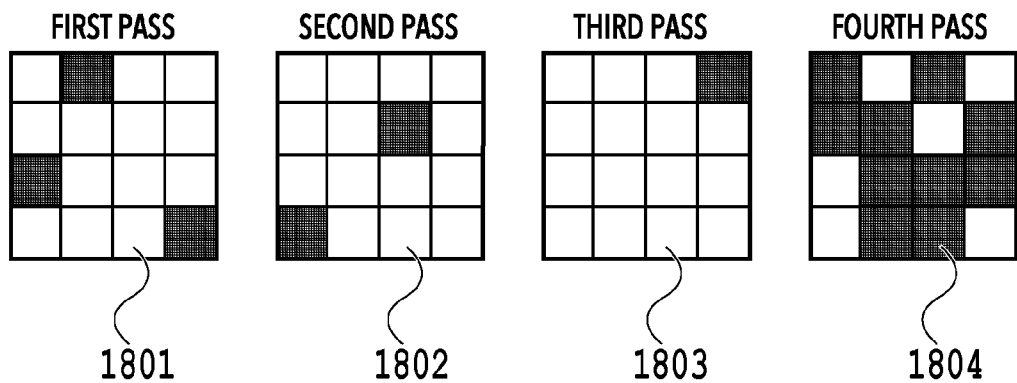
FIG. 15A is a diagram illustrating an example of masks for four passes in the embodiment.

FIG. 15A illustrates mask patterns 1801, 1802, 1803, and 1804 for first to fourth passes as mask patterns for four passes. A black pixel is the printing allowance pixel. In the mask pattern 1801 for the first pass, the printing allowance pixels are three pixels among all print pixels (16 pixels) and the print ratio is 18.75%. In the mask pattern 1802 for the second pass, the printing allowance pixels are two pixels and the print ratio is 12.5%. In the mask pattern 1803 for the third pass, the printing allowance pixel is one pixel and the print ratio is 6.25%. In the mask pattern 1804 for the fourth pass, the printing allowance pixels are 10 pixels and the print ratio is 62.5%.

Figure 15B:
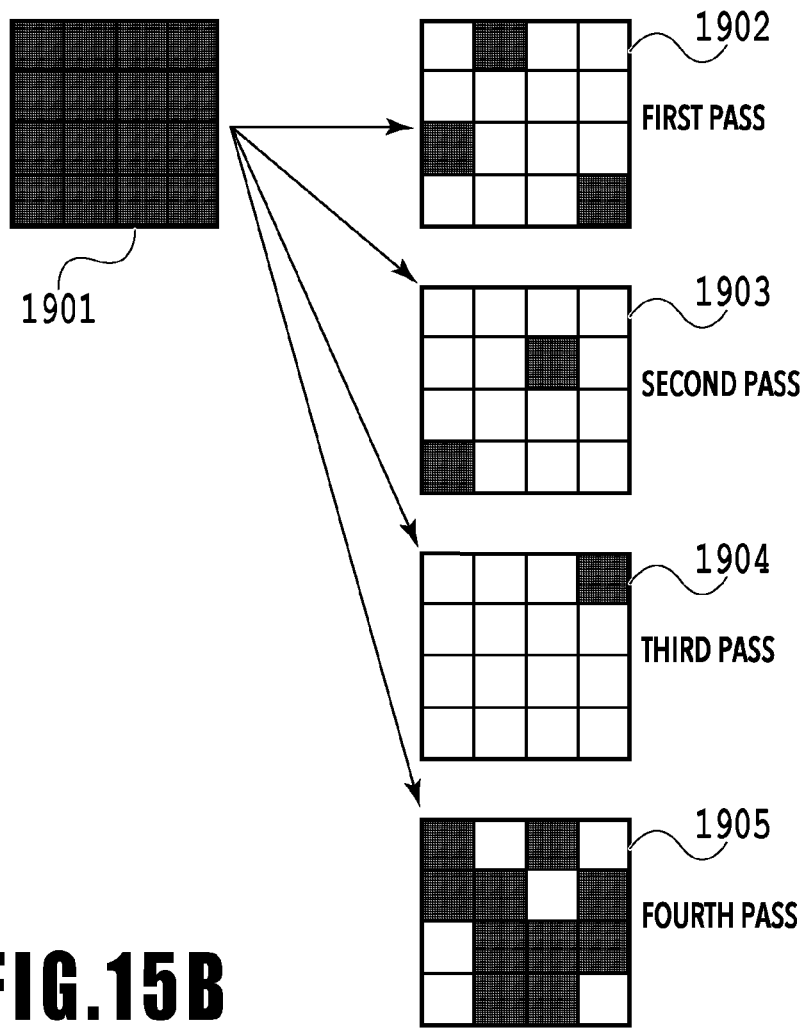
FIG. 15B is a diagram illustrating an example of a print data generation process.

FIG. 15B illustrates print data 1901 for silver ink obtained by binarizing a solid image in which ink is ejected to all print pixels. A masking process is performed for the print data 1901 using the mask patterns 1801 to 1804 illustrated in FIG. 15A to generate print data 1902, 1903, 1904, and 1905 of each pass. This embodiment is the same as the first embodiment except that the print ratios of the first to third passes are different from those in the first embodiment.

For ink droplets ejected in the first to third passes, the influence of a difference in the amount of ink ejected from each nozzle and the deviation of the landing position of ink in the ejection direction is averaged by the effect of the multi-pass printing and the density unevenness of a print image is reduced. Since the contact time of the silver particles in the fourth pass is maintained for a long time, the formation of a metal film by the silver particles progresses and a metallic gloss is improved.

Since the print ratios of the first to third passes are different from those in the first embodiment, there is a difference in the effect of reducing density unevenness. In particular, since the print ratio of the third pass is lower than those of the first pass and the second pass, the infiltration of the ink droplets ejected (applied) in the third pass into the print medium is completed in a short time. Therefore, the infiltration of the solvent in the ink droplets ejected up to the third pass into the print medium is completed before the ink droplets are ejected in the fourth pass. Since the number of ink droplets ejected in the fourth pass is large, the time until the solvent in the ink droplets is infiltrated into the print medium or the solvent is evaporated is long as in the first embodiment. Therefore, the formation of a metal film by the silver particles progresses and a silver particle film with a high metallic gloss is formed. The function of each pass is more effective than that in the first embodiment. As a result, it is possible to print an image with a high metallic gloss and low density unevenness.

Fifth Embodiment

In a fifth embodiment, the number of passes in multi-pass printing is four similarly to the first embodiment and the first to third passes include a pass in which no ink is ejected, that is, a pass with a print ratio of 0%.

Figure 16A:
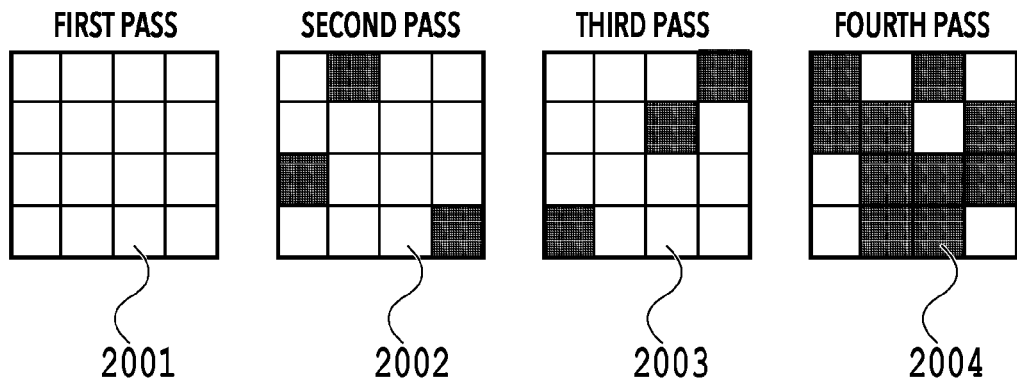
FIG. 16A is a diagram illustrating an example of masks for four passes in the embodiment.

FIG. 16A illustrates mask patterns 2001, 2002, 2003, and 2004 for first to fourth passes as mask patterns for four passes. A black pixel is the printing allowance pixel. In the mask pattern 2001 for the first pass, the number of printing allowance pixels among all print pixels (16 pixels) is 0 and the print ratio is 0%. In each of the mask patterns 2002 and 2003 for the second and third passes, the printing allowance pixels are three pixels and the print ratio is 18.75%. In the mask pattern 2004 for the fourth pass, the printing allowance pixels are 10 pixels and the print ratio is set to a high value of 62.5%.

Figure 16B:
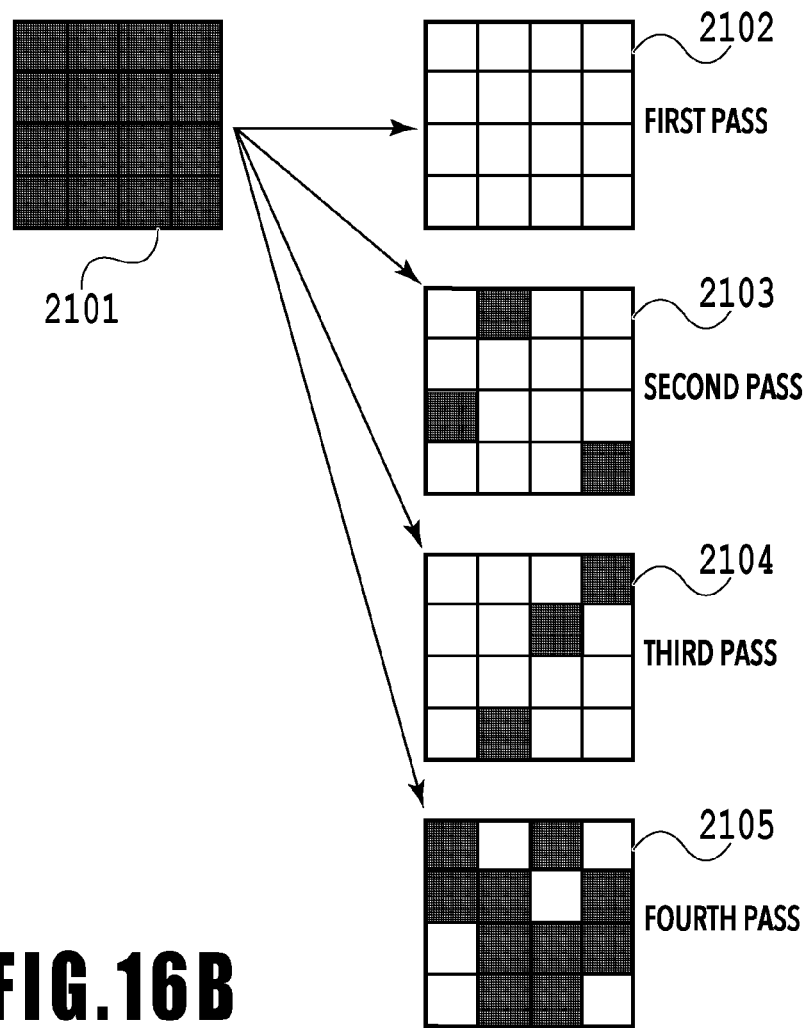
FIG. 16B is a diagram illustrating an example of a print data generation process.

FIG. 16B illustrates print data 2101 for silver ink obtained by binarizing a solid image in which ink is ejected to all print pixels. A masking process is performed for the print data 2101 using the mask patterns 2001 to 2004 illustrated in FIG. 16A to generate print data 2102, 2103, 2104, and 2105 of each pass. This embodiment is the same as the fourth embodiment except that the print ratios of the first to third passes are different from those in the fourth embodiment.

For ink droplets ejected (applied) in the second and third passes, the influence of a difference in the amount of ink ejected from each nozzle and the deviation of the landing position of ink in the ejection direction is averaged by the effect of the multi-pass printing and the density unevenness of a print image is reduced. Since the contact time of the silver particles in the fourth pass is maintained for a long time, the formation of a metal film by the silver particles progresses and a metallic gloss is improved. Since no ink droplets are ejected in the first pass, the effect of reducing density unevenness is slightly less than that in the fourth embodiment. However, in this embodiment, it is also possible to print an image with a sufficiently high metallic gloss and small density unevenness.

Sixth Embodiment

In a sixth embodiment, the number of passes in multi-pass printing is four similarly to the first embodiment, the print ratios of the first and second passes are set to a low value, and the print ratios of the third and fourth passes are set to a high value.

Figure 17A:
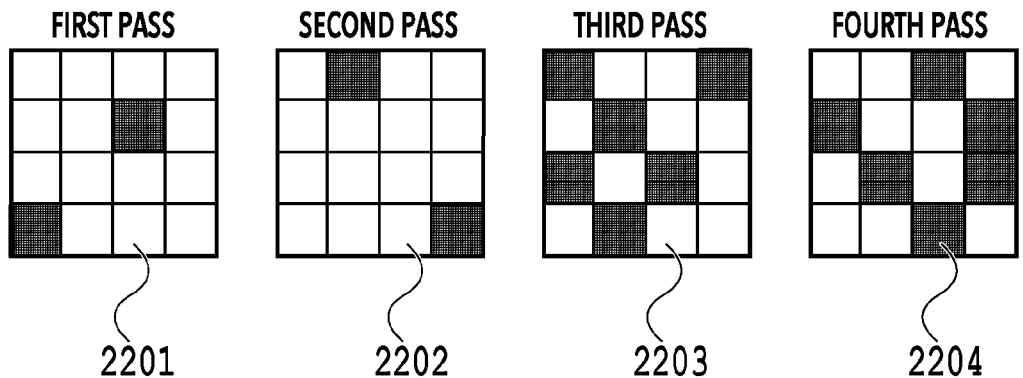
FIG. 17A is a diagram illustrating an example of masks for four passes in the embodiment.

FIG. 17A illustrates mask patterns 2201, 2202, 2203, and 2204 for first to fourth passes as mask patterns for four passes. A black pixel is the printing allowance pixel. In the mask patterns 2201 and 2202 for the first and second passes, the printing allowance pixels are two pixels among all print pixels (16 pixels) and the print ratio is set to a low value of 12.5%. In the mask patterns 2203 and 2204 for the third and fourth passes, the printing allowance pixels are six pixels and the print ratio is set to a high value of 31.25%.

Figure 17B:
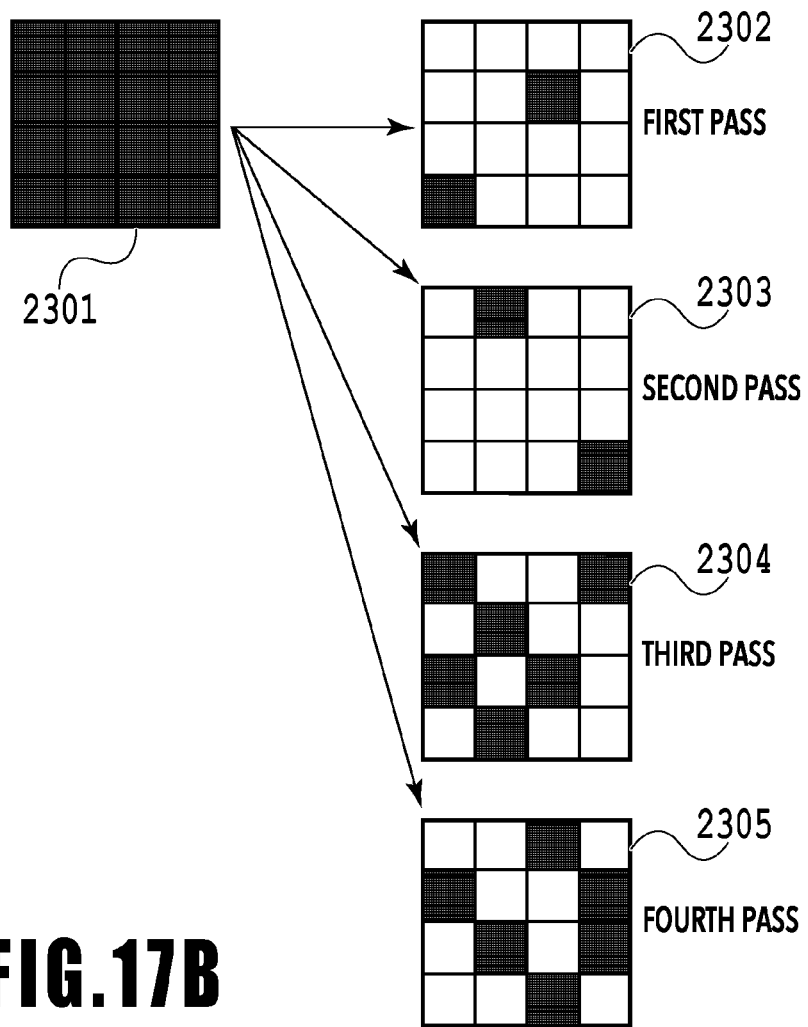
FIG. 17B is a diagram illustrating an example of a print data generation process.

FIG. 17B illustrates print data 2301 for silver ink obtained by binarizing a solid image in which ink is ejected to all print pixels. A masking process is performed for the print data 2301 using the mask patterns 2201 to 2204 illustrated in FIG. 17A to generate print data 2302, 2303, 2304, and 2305 of each pass. This embodiment is the same as the first embodiment except that the print ratios of the third and fourth passes are different from those in the first embodiment.

For ink droplets ejected (applied) in the first and second passes, the influence of a difference in the amount of ink ejected from each nozzle and the deviation of the landing position of ink in the ejection direction is averaged by the effect of the multi-pass printing and the density unevenness of a print image is reduced. In addition, since the contact time of the silver particles in the third and fourth passes is maintained for a long time, the formation of a metal film by the silver particles progresses and a metallic gloss is improved. The print ratios of the fourth pass is set to be lower than that in the first embodiment, but are sufficiently higher than the print ratios of the other passes with a density unevenness reduction function. Therefore, while a silver particle film is being formed by the contact between the silver particles after the ejection of the ink droplets in the third pass ends, the ink droplets are ejected in the fourth pass. As a result, the contact between the silver particles is further increased by the ejection of the ink droplets in the fourth pass and the formation of a silver particle film progresses. Therefore, it is possible to print the same image as that in the first embodiment. In this embodiment, it is also possible to print an image with a sufficiently high metallic gloss and small density unevenness.

Seventh Embodiment

In a seventh embodiment, the number of passes in multi-pass printing is two, the print ratio of the first pass is set to a low value, and the print ratio of the second pass is set to a high value.

Figure 18A:
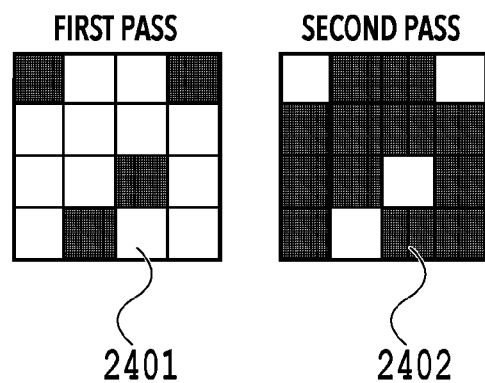
FIG. 18A is a diagram illustrating an example of masks for two passes in the embodiment.

FIG. 18A illustrates mask patterns 2401 and 2402 for the first and second passes as mask patterns for two passes. A black pixel is the printing allowance pixel. In the mask pattern 2401 for the first pass, the printing allowance pixels are four pixels among all print pixels (16 pixels) and the print ratio is set to a low value of 25.0%. In the mask pattern 2402 for the second pass, the printing allowance pixels are 12 pixels and the print ratio is set to a high value of 75.0%.

Figure 18B:
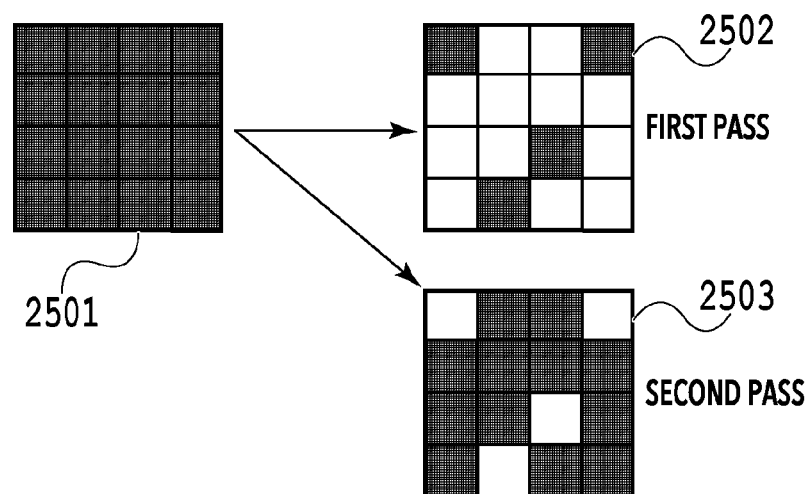
FIG. 18B is a diagram illustrating an example of a print data generation process.

FIG. 18B illustrates print data 2501 for silver ink obtained by binarizing a solid image in which ink is ejected to all print pixels. A masking process is performed for the print data 2501 using the mask patterns 2401 to 2402 illustrated in FIG. 18A to generate print data 2502 and 2503 of each pass.

Figure 19:
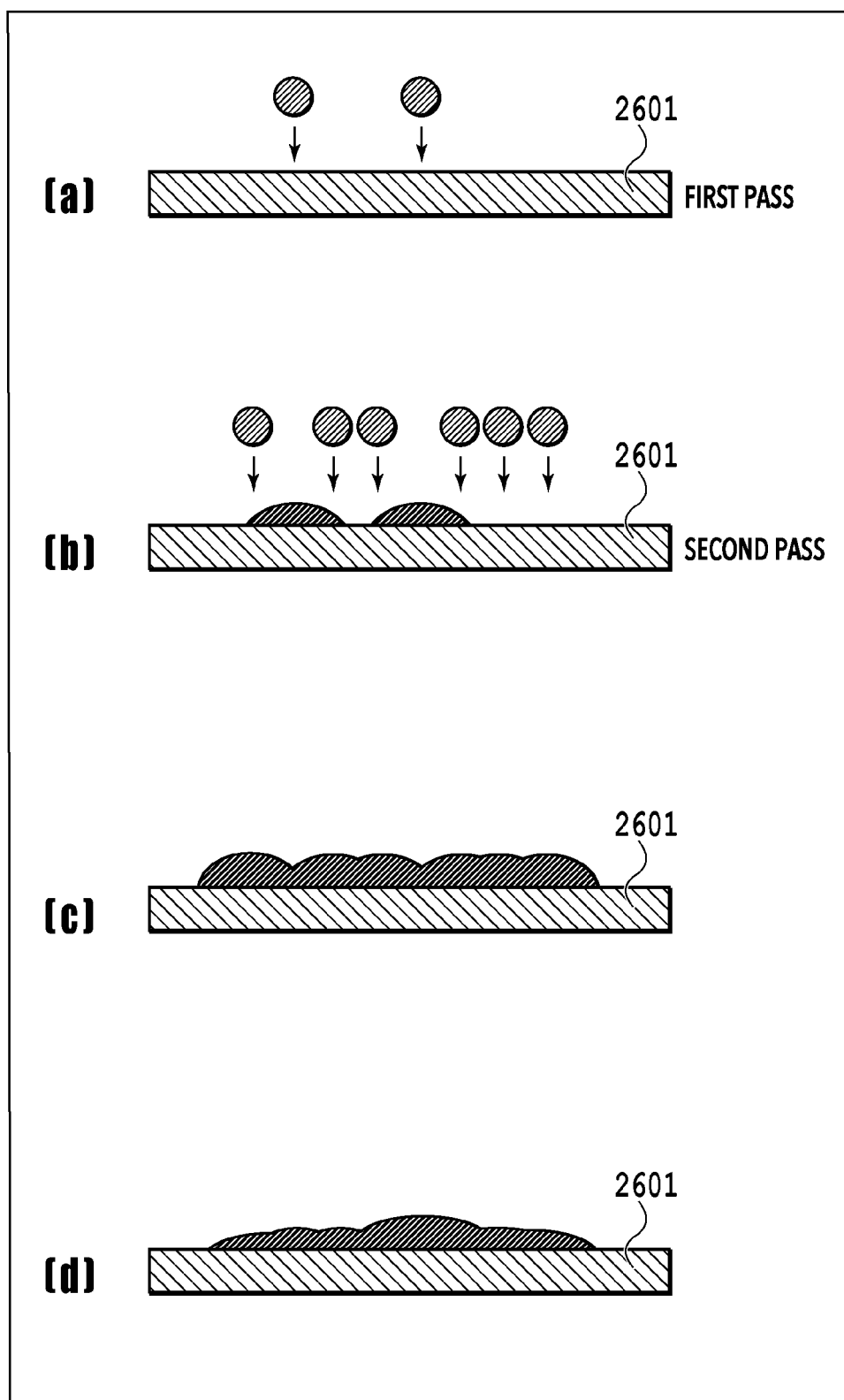
FIG. 19 is a diagram schematically illustrating an example of an aspect in which a silver particle film is formed on a print medium in the embodiment.

Parts (a) to (c) of FIG. 19 are diagrams illustrating an aspect in which a print head ejects silver ink on the basis of the print data of each pass illustrated in FIG. 18B to form a silver particle film on a print medium. The parts (a) and (b) of FIG. 19 illustrate a state immediately before the silver ink ejected from the print head in each pass lands on a print medium 2601. Similarly to the first embodiment, the time difference between the passes is about 300 msec and the time from the landing of the silver ink on the print medium to the end of infiltration of a solvent in the ink into the print medium is about several tens of milliseconds per droplet.

As illustrated in the part (a) of FIG. 19, a small number of ink droplets are ejected (applied) in the first pass. Therefore, after the ink droplets land on the print medium 2601, the ink droplets do come into contact with each other and the infiltration of a solvent in the ink into the print medium starts as illustrated in the part (b) of FIG. 19. In the stage illustrated in the part (b) of FIG. 19, the infiltration of the solvent in the ink into the print medium almost ends.

As illustrated in the part (b) of FIG. 19, a large number of ink droplets are ejected in the second pass. Therefore, after these ink droplets land on the print medium 2601, these ink droplets come into contact with each other and the infiltration of the solvent in the ink into the print medium starts as illustrated in the part (c) of FIG. 19. Since a large amount of ink is ejected in the second pass and it takes a long time for the solvent to be infiltrated into the print medium or to be evaporated, the formation of a metal film by the silver particles progresses and a silver particle film with a high metallic gloss is formed (part (d) of FIG. 19).

The first pass with a low print ratio has a function of reducing the density unevenness of a print image. In addition, the contact between the silver particles occurs by the ejection of ink droplets in the second pass with a high print ratio. As a result, the formation of a metal film progresses and an image with a high metallic gloss is printed. In this embodiment, since the first pass is only the pass with a low print ratio which has the density unevenness reduction function, the effect of reducing density unevenness is less than that in the first embodiment, but an image with a higher metallic gloss can be printed. In this embodiment, it is also possible to print an image with a sufficiently high metallic gloss and small density unevenness.

Eighth Embodiment

An eighth embodiment is the same as the first embodiment in that the number of passes in multi-pass printing is four, but differs from the first embodiment in a method for creating the print data of each pass. Specifically, in the first embodiment, multi-valued print data is binarized and the print data is distributed on the basis of the print ratio of each pass. In contrast, in the eighth embodiment, first, multi-valued data is converted into paired data for each pass on the basis of the print ratio of each pass and each multi-valued data item for each pass is quantized to generate binary print data.

Figure 20:
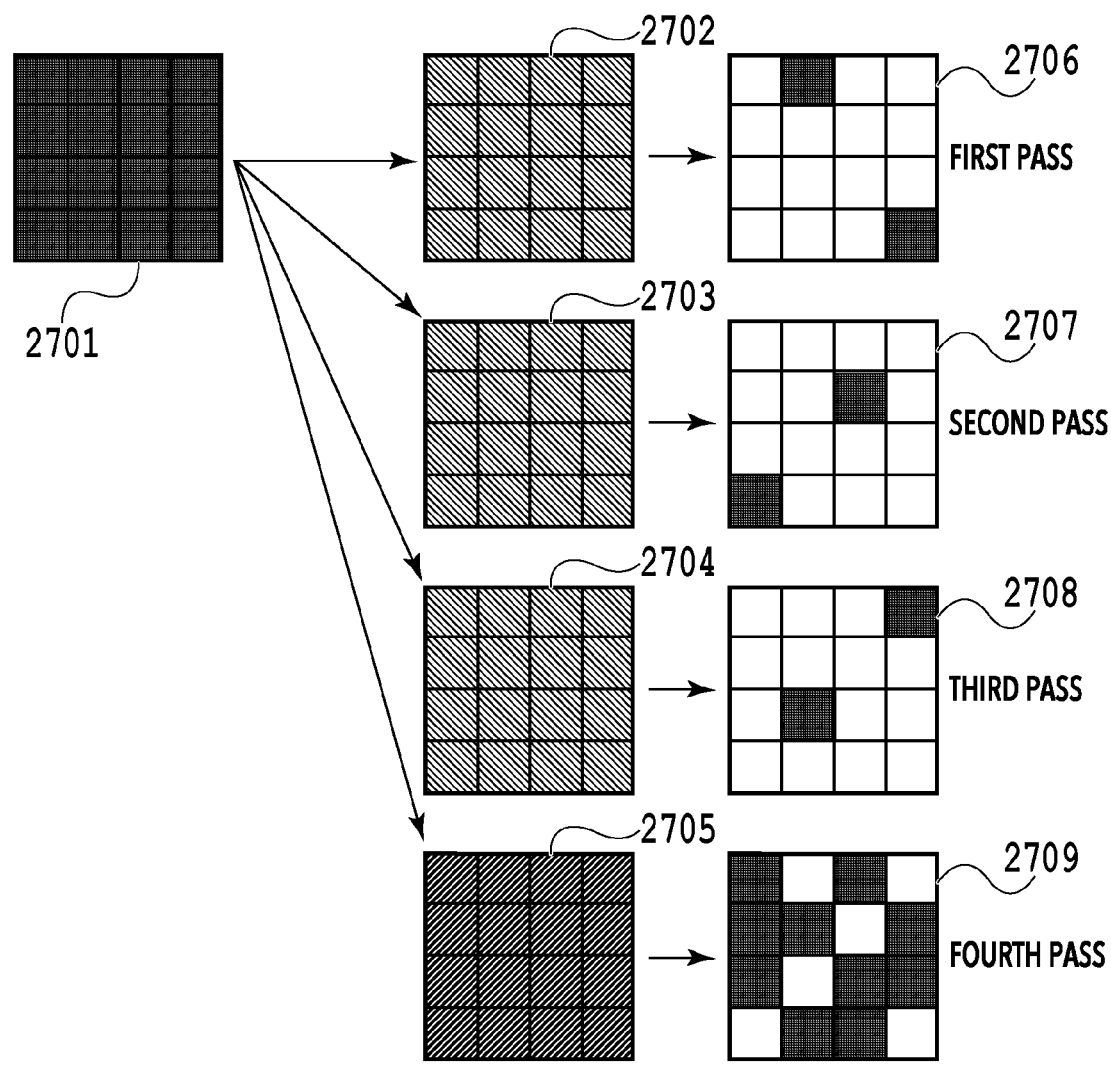
FIG. 20 is a diagram illustrating a process of quantizing multi-valued data according to each pass ratio in the embodiment.

FIG. 20 illustrates multi-valued print data 2701 for silver ink which corresponds to a solid image in which ink is ejected to all print pixels. The multi-valued print data 2701 is converted into multi-valued data 2702, 2703, 2704, and 2705 of each pass on the basis of the print ratios (12.5%, 12.5%, 12.5%, and 62.5%) of each pass. These multi-valued data 2702, 2703, 2704, and 2705 are binarized to generate print data 2706, 2707, 2708, and 2709 of each pass. In this embodiment, a known dither method is used as a binarization method. In addition, different dither methods are used for each pass such that these print data of each pass complement each other. The binarization method is not particularly limited.

A print head ejects silver ink droplets on the basis of the generated print data of each pass to apply silver ink to a print medium. Since the print ratios of each pass are the same as those in the first embodiment, the description thereof will not be repeated. In this embodiment in which a print data creation method is different from that in the first embodiment, it is also possible to print an image with a sufficiently high metallic gloss and small density unevenness.

Ninth Embodiment

A ninth embodiment is the same as the first embodiment in that the number of passes is four and the print ratio of the fourth pass is set to a high value. However, in this embodiment, the print ratio of the fourth pass varies depending on a print duty based on print data.

The print duty means the amount of ink ejected (applied) to a unit print area by one printing scan of the print head. The print duty can be calculated for each type of ink on the basis of print data. For example, the number of dots to be formed in each of a plurality of unit areas forming a print area (the number of pixels to which ink droplets are ejected) by one printing scan is counted and the count values for each unit area are added to calculate the total number of dots (the total number of pixels) to be formed in the print area by one printing scan. Then, the proportion of the total number of dots to the number of dots that can be formed in the print area (the number of pixels to which ink droplets can be ejected) by one printing scan can be calculated as the print duty.

Figure 21:
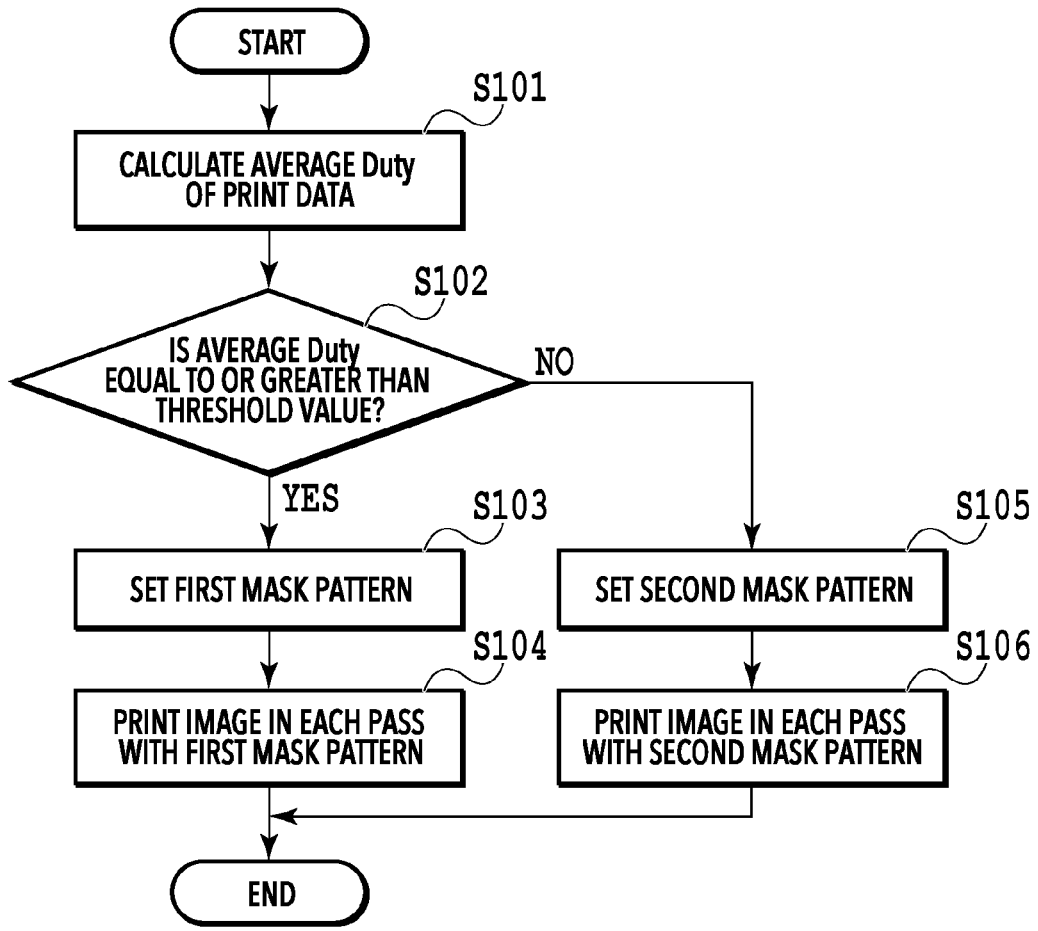
FIG. 21 is a flowchart illustrating a process of performing printing using masks corresponding to a print duty in the embodiment.

FIG. 21 is a flowchart illustrating a process which sets a mask pattern according to the print duty and performs printing.

First, in the print data created by the above-mentioned print data generation process, the proportion of the pixels to which silver ink is ejected (applied) is calculated as an "average duty" (S101). Then, the calculated average duty is compared with a predetermined threshold value (S102). In a case where the average duty is equal to or greater than the threshold value, a first mask pattern is set (S103). A masking process is performed for the print data using the first mask pattern and an image is printed on the basis of the processed print data in each pass (S104). On the other hand, in a case where the calculated average duty is less than the threshold value, a second mask pattern is set (S105). A masking process is performed for the print data using the second mask pattern and an image is printed on the basis of the processed print data in each pass (S106). As such, the mask pattern is set according to the duty of the print data and printing is performed.

In this embodiment, the mask pattern according to the first embodiment illustrated in FIG. 9A is used as the first mask pattern. In the mask pattern, the print ratios of the first to third passes are set to 12.5% and the print ratio of the fourth pass is set to 62.5%. In addition, the mask pattern according to the second embodiment illustrated in FIG. 12A is used as the second mask pattern. In the mask pattern, the print ratios of the first to third passes are set to 6.25% and the print ratio of the fourth pass is set to 81.25%. That is, in the second mask pattern, the print ratios of the first to third passes are lower than those in the first mask pattern and the print ratio of the fourth pass is higher than that in the first mask pattern. In this embodiment, the threshold value compared with the average duty is 80.

Figure 22A:
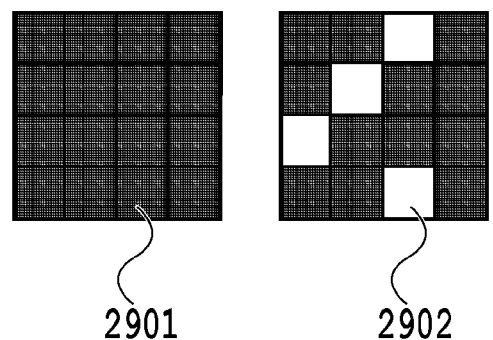
FIG. 22A is a diagram illustrating original print data in the embodiment.

FIG. 22A illustrates original print data 2901 and print data 2902 having different print duties. First, a case where an image is printed on the basis of the print data 2901 will be described.

The CPU calculates the average duty of the received print data 2901 (S101 in FIG. 21). Since the print data 2901 corresponds to a solid image in which ink is ejected to all print pixels, the average duty is 100. Then, the average duty is compared with the threshold value (S102). Since the average duty of the print data 2901 is 100 that is greater than the threshold value of 80, the first mask pattern is set (S103). A masking process is performed for the print data 2901 using the first mask pattern to generate the print data of each pass and an image is printed on the basis of the print data (S104). Since a method for generating the print data of each pass from the print data 2901 using the first mask pattern is the same as that in the first embodiment, the description thereof will not be repeated.

Since the first mask pattern is used for the print data 2901 with a high print duty, it is possible to print an image with a sufficiently high metallic gloss and small density unevenness.

Next, a case where an image is printed on the basis of the print data 2902 will be described.

The CPU calculates the average duty of the received print data 2902 (S101 in FIG. 21). Since the print data 2902 corresponds to an image in which ink is ejected to 12 pixels among all print pixels (16 pixels), the average duty is 75. Then, the average duty is compared with the threshold value (S102). Since the average duty of the print data 2902 is 75 that is less than the threshold value of 80, the second mask pattern is set (S105). A masking process is performed for the print data 2902 using the second mask pattern to generate the print data of each pass and an image is printed on the basis of the print data (S106).

Figure 22B:
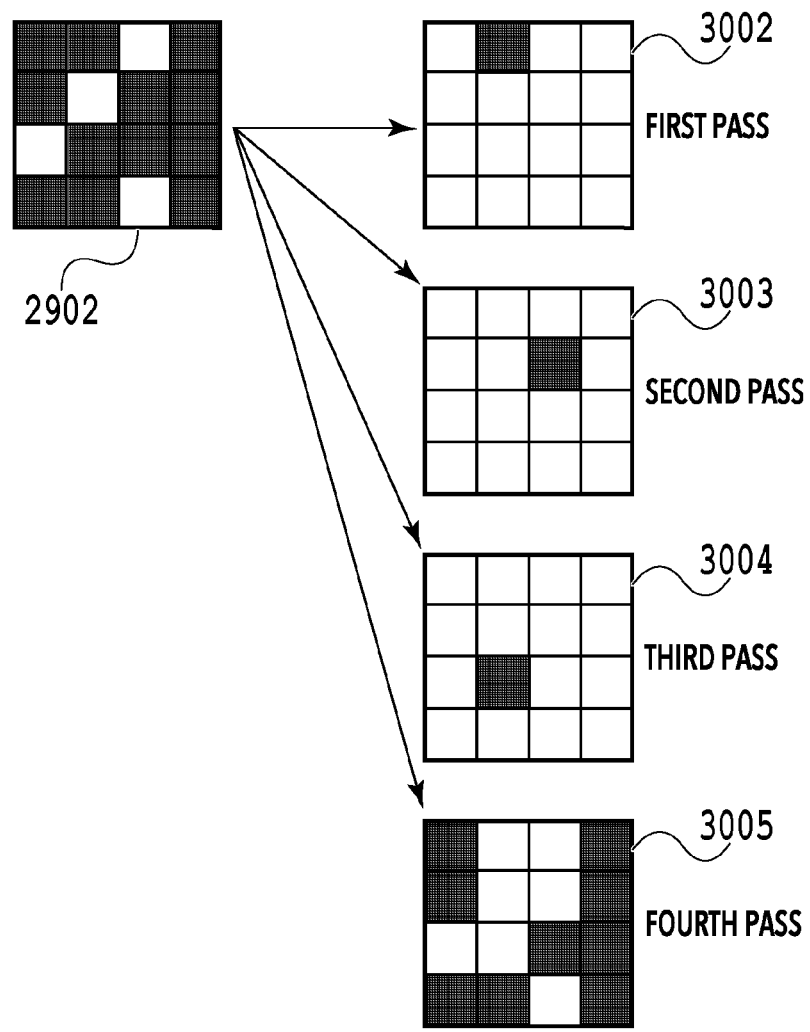
FIG. 22B is a diagram illustrating an example of a print data generation process.

FIG. 22B is a diagram illustrating a process of generating print data 3002, 3003, 3004, and 3005 of each pass from the print data 2902 using the second mask pattern (the mask pattern illustrated in FIG. 12A). Since the process is the same as that in the first embodiment except that the print ratios of each pass are different from those in the first embodiment, the description thereof configuration will not be repeated.

For ink droplets ejected (supplied) in the first to third passes with a low print ratio, the influence of a difference in the amount of ink ejected from each nozzle and the deviation of the landing position of ink in the ejection direction is averaged by the effect of the multi-pass printing and the density unevenness of a print image is reduced. In addition, since the contact time of the silver particles in the fourth pass with a high print ratio is maintained for a long time, the formation of a metal film by the silver particles progresses and a metallic gloss is improved.

In this embodiment, in a case where the duty of the original print data is less than the threshold value (NO in S102), the mask pattern in which the print ratio of the fourth pass that is higher than that in a case where the duty is equal to or greater than the threshold value (YES in S102) is selected and used (S105). Therefore, the amount of silver ink ejected in the fourth pass with a high print ratio is equal to or greater than a predetermined value, regardless of the duty of the print data. As a result, it is possible to print an image with a high metallic gloss and small density unevenness.

According to this embodiment, it is possible to print an image with a sufficiently high metallic gloss and small density unevenness, regardless of the print duty of the original print data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-136434, filed Jul. 12, 2017, which is hereby incorporated by reference wherein in its entirety.

What is claimed is:
1. An ink-jet printing apparatus comprising:
 a print head in which a plurality of ejection ports for ejecting metallic ink to a print medium, the metallic ink including a solvent and metal particles for imparting a metallic gloss, are arranged in a predetermined direction, wherein, when the metallic ink is applied on the print medium, an amount of solvent is reduced and the metal particles are concentrated to form a metal particle film on the print medium; and a control unit configured to perform a plurality of printing scans to the same area of the print medium to print an image on the print medium, so that in a printing scan, the metallic ink is ejected from the print head to the print medium while moving the print head in a scanning direction intersecting the predetermined direction, wherein the control unit sets a print ratio of the metallic ink in a predetermined scan to be equal to or greater than half a sum of print ratios of the metallic ink in the plurality of printing scans, and sets a print ratio of the metallic ink in at least one scan of the plurality of printing scans different from the predetermined scan to be greater than zero, and wherein the print ratio of the metallic ink in each of the plurality of printing scans is determined by dividing a unit area on the print medium by an area covered by dots to be formed in the unit area.

2. The ink-jet printing apparatus according to claim 1, wherein the control unit sets the print ratio of the predetermined scan to be equal to or greater than a print ratio required for the metallic ink dots, which are dispersively formed on the print medium by one printing scan, to cover an entire unit area of the print medium.

3. The ink-jet printing apparatus according to claim 1, wherein the control unit sets any one of the printing scans corresponding to a latter half of the plurality of printing scans as the predetermined scan.

4. The ink-jet printing apparatus according to claim 1, wherein the control unit sets two or more consecutive printing scans as the predetermined scan.

5. The ink-jet printing apparatus according to claim 1, wherein the control unit changes the print ratio of the predetermined scan depending on an amount of metallic ink ejected by the plurality of printing scans.

6. The ink-jet printing apparatus according to claim 1, wherein the control unit sets the print ratio of the predetermined scan such that the print ratio of the predetermined scan becomes higher as an amount of metallic ink ejected by the plurality of printing scans becomes smaller.

7. The ink-jet printing apparatus according to claim 1, wherein the control unit performs the plurality of printing scans so that in the printing scan, cyan ink is ejected from the print head to the print medium while moving the print head in the scanning direction.

8. The ink-jet printing apparatus according to claim 1, wherein the control unit performs the plurality of printing scans such that the print ratio of the metallic ink in the plurality of printing scans is greater than zero.

9. The ink-jet printing apparatus according to claim 1, wherein the metal particles are silver particles.

10. The ink-jet printing apparatus according to claim 1, wherein the control unit controls the print ratio of the metallic ink in the plurality of printing scans using a mask pattern indicating a printing allowance pixel for the plurality of printing scans with respect to the same area.

11. The ink-jet printing apparatus according to claim 1, wherein a plurality of printing scans is three or more scans.

12. The ink-jet printing apparatus according to claim 11, wherein the predetermined scan is the first scan in the plurality of printing scans.

13. The ink-jet printing apparatus according to claim 11, wherein the predetermined scan is the final scan in the plurality of printing scans.

14. An ink-jet printing method that uses a print head in which a plurality of ejection ports for ejecting metallic ink to a print medium, including a solvent and metal particles for imparting a metallic gloss, are arranged in a predetermined direction, a plurality of printing scans being performed to the same area of the print medium to print an image on the print medium, in the printing scan, the metallic ink being ejected from the print head to the print medium while moving the print head in a scanning direction intersecting the predetermined direction, the metal particles forming a metal particle film by coming into contact with each other on the print medium, the method comprising:

a controlling step of performing the plurality of printing scans and setting a print ratio of the metallic ink in a predetermined scan to be equal to or greater than half a sum of print ratios of the metallic ink in the plurality of printing scans, and setting a print ratio of the metallic ink in at least one scan of the plurality of printing scans different from the predetermined scan to be greater than zero, wherein the print ratio of the metallic ink in each of the plurality of printing scans is determined by dividing a unit area on the print medium by an area covered by dots to be formed in the unit area.

15. The ink-jet printing method according to claim 14, wherein, in the control step, the print ratio of the predetermined scan is set to be equal to or greater than a print ratio required for the metallic ink dots, which are dispersively formed on the print medium by one printing scan, to cover an entire unit area of the print medium.

16. The ink-jet printing method according to claim 11, wherein, in the control step, any one of the printing scans corresponding to a latter half of the plurality of printing scans is set as the predetermined scan.

17. The ink-jet printing method according to claim 14, wherein, in the control step, two or more consecutive printing scans are set as the predetermined scan.

18. The ink-jet printing method according to claim 14, wherein, in the control step, the print ratio of the predetermined scan is changed depending on an amount of metallic ink ejected by the plurality of printing scans.

19. The ink-jet printing method according to claim 14, wherein, in the control step, the print ratio of the predetermined scan is set such that the print ratio of the predetermined scan becomes higher as an amount of metallic ink ejected by the plurality of printing scans becomes smaller.

20. A non-transitory computer-readable storage medium which stores a program causing a computer to perform the ink-jet printing method that uses a print head in which a plurality of ejection ports for ejecting metallic ink to a print medium, including a solvent and metal particles for imparting a metallic gloss, are arranged in a predetermined direction, a plurality of printing scans being performed to the same area of the print medium to print an image on the print medium, in the printing scan, the metallic ink being ejected from the print head to the print medium while moving the print head in a scanning direction intersecting the predetermined direction, the metal particles forming a metal particle film by coming into contact with each other on the print medium, the method comprising:

a controlling step of performing the plurality of printing scans and setting a print ratio of the metallic ink in a predetermined scan to be equal to or greater than half a sum of print ratios of the metallic ink in the plurality of printing scans and setting a print ratio of the metallic ink in at least one scan of the plurality of printing scans except the predetermined scan to be greater than zero, wherein the print ratio of the metallic ink in each of the plurality of printing scans is determined by dividing a unit area on the print medium by an area covered by dots to be formed in the unit area.

21. An ink-jet printing apparatus comprising:
a print head in which a plurality of ejection ports for ejecting metallic ink to a print medium, the metallic ink including a solvent and metal particles for imparting a metallic gloss, are arranged in a predetermined direction, wherein, when the metallic ink is applied on the print medium, an amount of solvent is reduced and the metal particles are concentrated to form a metal particle film on the print medium; and
a control unit configured to perform a plurality of printing scans to the same area of the print medium to print an image on the print medium, so that in a printing scan, the metallic ink is ejected from the print head to the print medium while moving the print head in a scanning direction intersecting the predetermined direction,
wherein the control unit sets a print ratio of the metallic ink in a predetermined scan to be greater than half a sum of print ratios of the metallic ink in the plurality of printing scans, and sets a print ratio of the metallic ink in at least one scan of the plurality of printing scans different from the predetermined scan to be greater than zero, and
wherein the print ratio of the metallic ink in each of the plurality of printing scans is determined by dividing a unit area on the print medium by an area covered by dots to be formed in the unit area.

* * * * *